(12) United States Patent
Neumeier et al.

(10) Patent No.: US 10,945,006 B2
(45) Date of Patent: *Mar. 9, 2021

(54) METHODS FOR IDENTIFYING VIDEO SEGMENTS AND DISPLAYING OPTION TO VIEW FROM AN ALTERNATIVE SOURCE AND/OR ON AN ALTERNATIVE DEVICE

(71) Applicant: INSCAPE DATA, INC., Irvine, CA (US)

(72) Inventors: Zeev Neumeier, Berkeley, CA (US); Michael Collette, San Rafael, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,292

(22) Filed: Jul. 23, 2019

(65) Prior Publication Data

US 2020/0059681 A1    Feb. 20, 2020

Related U.S. Application Data

(63) Continuation of application No. 16/141,598, filed on Sep. 25, 2018, now Pat. No. 10,405,014, which is a (Continued)

(51) Int. Cl.
*H04N 21/2343* (2011.01)
*H04N 21/234* (2011.01)
(Continued)

(52) U.S. Cl.
CPC . *H04N 21/23439* (2013.01); *H04N 21/23418* (2013.01); *H04N 21/44008* (2013.01);
(Continued)

(58) Field of Classification Search
None
See application file for complete search history.

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| CA | 2501316 | 9/2005 |
| CN | 1557096 | 12/2004 |

(Continued)

OTHER PUBLICATIONS

International Search Report and Written Opinion dated Mar. 31, 2015 for PCT Application No. PCT/US2014/072255, 8 pages.

(Continued)

*Primary Examiner* — Alexander Q Huerta
(74) *Attorney, Agent, or Firm* — Polsinelli LLP

(57) ABSTRACT

Techniques and systems are provided for identifying a video segment displayed on a screen of a remote television system, and providing an option to switch to an alternative or related version of the video program that includes the video segment. For example, video segments displayed on a screen of a television system can be identified, and contextually-targeted content or contextually-related alternative content can be provided to a television system based on the identification of a video segment. The alternative or related version of the video program can include the currently displayed program in an on-demand format that can be viewed off-line and can be started over from a beginning portion of the program.

20 Claims, 10 Drawing Sheets

Related U.S. Application Data continuation of application No. 15/011,099, filed on Jan. 29, 2016, now Pat. No. 10,116,972.

(60) Provisional application No. 62/110,224, filed on Jan. 30, 2015.

(51) Int. Cl.
  *H04N 21/472* (2011.01)
  *H04N 21/4722* (2011.01)
  *H04N 21/658* (2011.01)
  *H04N 21/44* (2011.01)

(52) U.S. Cl.
  CPC ....... *H04N 21/472* (2013.01); *H04N 21/4722* (2013.01); *H04N 21/47202* (2013.01); *H04N 21/47217* (2013.01); *H04N 21/6582* (2013.01)

(56) References Cited

U.S. PATENT DOCUMENTS

| | | | |
|---|---|---|---|
| 4,739,398 A | 4/1988 | Thomas et al. |
| 5,019,899 A | 5/1991 | Boles et al. |
| 5,193,001 A | 3/1993 | Kerdranvrat |
| 5,210,820 A | 5/1993 | Kenyon |
| 5,319,453 A | 6/1994 | Copriviza et al. |
| 5,436,653 A | 7/1995 | Ellis et al. |
| 5,481,294 A | 1/1996 | Thomas et al. |
| 5,557,334 A | 9/1996 | Legate |
| 5,572,246 A | 11/1996 | Ellis et al. |
| 5,812,286 A | 9/1998 | Li |
| 5,826,165 A | 10/1998 | Echeita et al. |
| 5,918,223 A | 6/1999 | Blum et al. |
| 6,008,802 A | 12/1999 | Goldschmidt et al. |
| 6,025,837 A | 2/2000 | Matthews, III et al. |
| 6,035,177 A | 3/2000 | Moses et al. |
| 6,064,764 A | 5/2000 | Bhaskaran et al. |
| 6,298,482 B1 | 10/2001 | Seidman |
| 6,381,362 B1 | 4/2002 | Deshpande et al. |
| 6,415,438 B1 | 7/2002 | Blackketter et al. |
| 6,463,585 B1 | 10/2002 | Hendricks et al. |
| 6,469,749 B1 | 10/2002 | Dimitrova |
| 6,577,346 B1 | 6/2003 | Perlman |
| 6,577,405 B2 | 6/2003 | Kranz et al. |
| 6,628,801 B2 | 9/2003 | Powell et al. |
| 6,647,548 B1 | 11/2003 | Lu et al. |
| 6,675,174 B1 | 1/2004 | Bolle et al. |
| 6,771,316 B1 | 8/2004 | Iggulden |
| 6,804,659 B1 | 10/2004 | Graham et al. |
| 6,978,470 B2 | 12/2005 | Swix et al. |
| 6,990,453 B2 | 1/2006 | Wang et al. |
| 7,028,327 B1 | 4/2006 | Dougherty et al. |
| 7,039,930 B1 | 5/2006 | Goodman et al. |
| 7,050,068 B1 | 5/2006 | Bastos et al. |
| 7,051,351 B2 | 5/2006 | Goldman et al. |
| 7,064,796 B2 | 6/2006 | Roy et al. |
| 7,089,575 B2 | 8/2006 | Agnihotri et al. |
| 7,098,959 B2 | 8/2006 | Mishima et al. |
| 7,136,875 B2 | 11/2006 | Anderson et al. |
| 7,178,106 B2 | 2/2007 | Lamkin et al. |
| 7,210,157 B2 | 4/2007 | Devara |
| 7,346,512 B2 | 3/2008 | Wang et al. |
| 7,356,830 B1 | 4/2008 | Dimitrova |
| 7,421,723 B2 | 9/2008 | Harkness et al. |
| 7,545,984 B1 | 6/2009 | Kiel et al. |
| 7,590,998 B2 | 9/2009 | Hanley |
| 7,623,823 B2 | 11/2009 | Zito et al. |
| 7,787,696 B2 | 8/2010 | Wilhelm et al. |
| 7,793,318 B2 | 9/2010 | Deng |
| 7,933,451 B2 | 4/2011 | Kloer |
| 8,001,571 B1 | 8/2011 | Schwartz et al. |
| 8,094,872 B1 | 1/2012 | Yagnik et al. |
| 8,171,004 B1 | 5/2012 | Kaminski, Jr. et al. |
| 8,171,030 B2 | 5/2012 | Peira et al. |
| 8,175,413 B1 | 5/2012 | Ioffe et al. |
| 8,189,945 B2 | 5/2012 | Stojancic et al. |
| 8,195,589 B2 | 6/2012 | Bakke et al. |
| 8,195,689 B2 | 6/2012 | Ramanathan et al. |
| 8,229,227 B2 | 7/2012 | Stojancic et al. |
| 8,335,786 B2 | 12/2012 | Peira et al. |
| 8,352,535 B2 | 1/2013 | Peled |
| 8,364,703 B2 | 1/2013 | Ramanathan et al. |
| 8,385,644 B2 | 2/2013 | Stojancic et al. |
| 8,392,789 B2 | 3/2013 | Biscondi et al. |
| 8,494,234 B1 | 7/2013 | Djordjevic et al. |
| 8,522,283 B2 | 8/2013 | Laligand et al. |
| 8,595,781 B2 | 11/2013 | Neumeier et al. |
| 8,619,877 B2 | 12/2013 | McDowell |
| 8,625,902 B2 | 1/2014 | Baheti et al. |
| 8,769,854 B1 | 7/2014 | Battaglia |
| 8,776,105 B2 | 7/2014 | Sinha et al. |
| 8,832,723 B2 | 9/2014 | Sinha et al. |
| 8,856,817 B2 | 10/2014 | Sinha et al. |
| 8,893,167 B2 | 11/2014 | Sinha et al. |
| 8,893,168 B2 | 11/2014 | Sinha et al. |
| 8,898,714 B2 | 11/2014 | Neumeier et al. |
| 8,918,804 B2 | 12/2014 | Sinha et al. |
| 8,918,832 B2 | 12/2014 | Sinha et al. |
| 8,930,980 B2 | 1/2015 | Neumeier et al. |
| 8,959,202 B2 | 2/2015 | Haitsma et al. |
| 9,055,309 B2 | 6/2015 | Neumeier et al. |
| 9,055,335 B2 | 6/2015 | Neumeier et al. |
| 9,071,868 B2 | 6/2015 | Neumeier et al. |
| 9,094,714 B2 | 7/2015 | Neumeier et al. |
| 9,094,715 B2 | 7/2015 | Neumeier et al. |
| 9,262,671 B2 | 2/2016 | Unzueta |
| 9,368,021 B2 | 6/2016 | Touloumtzis |
| 9,449,090 B2 | 9/2016 | Neumeier et al. |
| 9,465,867 B2 | 10/2016 | Hoarty |
| 9,838,753 B2 | 12/2017 | Neumeier et al. |
| 9,955,192 B2 | 4/2018 | Neumeier et al. |
| 10,080,062 B2 | 9/2018 | Neumeier et al. |
| 10,116,972 B2 | 10/2018 | Neumeier et al. |
| 10,169,455 B2 | 1/2019 | Neumeier et al. |
| 10,185,768 B2 | 1/2019 | Neumeier et al. |
| 10,192,138 B2 | 1/2019 | Neumeier et al. |
| 10,271,098 B2 | 4/2019 | Neumeier et al. |
| 10,284,884 B2 | 5/2019 | Neumeier et al. |
| 10,306,274 B2 | 5/2019 | Neumeier et al. |
| 10,375,451 B2 | 8/2019 | Neumeier et al. |
| 10,405,014 B2 | 9/2019 | Neumeier et al. |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054069 A1 | 5/2002 | Britt et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0078144 A1 | 6/2002 | Lamkin et al. |
| 2002/0083060 A1 | 6/2002 | Wang et al. |
| 2002/0083442 A1* | 6/2002 | Eldering .............. H04N 21/812 725/34 |
| 2002/0100041 A1 | 7/2002 | Rosenberg et al. |
| 2002/0105907 A1 | 8/2002 | Bruekers et al. |
| 2002/0120925 A1 | 8/2002 | Logan |
| 2002/0122042 A1 | 9/2002 | Bates |
| 2002/0144262 A1* | 10/2002 | Plotnick .............. H04N 21/252 725/32 |
| 2002/0162117 A1 | 10/2002 | Pearson et al. |
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0105794 A1 | 6/2003 | Jasinschi |
| 2003/0121037 A1 | 6/2003 | Swix et al. |
| 2003/0121046 A1 | 6/2003 | Roy et al. |
| 2003/0147561 A1 | 8/2003 | Faibish et al. |
| 2003/0182291 A1 | 9/2003 | Kurupati |
| 2003/0188321 A1 | 10/2003 | Shoff et al. |
| 2003/0208763 A1 | 11/2003 | McElhatten et al. |
| 2004/0045020 A1 | 3/2004 | Witt et al. |
| 2004/0059708 A1 | 3/2004 | Dean et al. |
| 2004/0183825 A1 | 9/2004 | Stauder et al. |
| 2004/0216171 A1 | 10/2004 | Barone et al. |
| 2004/0221237 A1 | 11/2004 | Foote et al. |

(56) References Cited

U.S. PATENT DOCUMENTS

| | | |
|---|---|---|
| 2004/0226035 A1 | 11/2004 | Hauser |
| 2004/0237102 A1* | 11/2004 | Konig ............... H04N 21/4755 725/36 |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0172312 A1 | 8/2005 | Lienhart et al. |
| 2005/0207416 A1 | 9/2005 | Rajkotia |
| 2005/0209065 A1 | 9/2005 | Schlosser |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0009235 A1 | 1/2007 | Walters et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0124762 A1 | 5/2007 | Chickering et al. |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0242880 A1 | 10/2007 | Stebbings |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0249986 A1* | 10/2008 | Clarke-Martin ... G06Q 30/0251 |
| 2008/0263620 A1 | 10/2008 | Berkvens et al. |
| 2008/0276266 A1 | 11/2008 | Huchital et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0116702 A1 | 5/2009 | Conradt |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0083299 A1 | 4/2010 | Nelson |
| 2010/0115543 A1 | 5/2010 | Falcon |
| 2010/0115574 A1 | 5/2010 | Hardt et al. |
| 2010/0125870 A1 | 5/2010 | Ukawa et al. |
| 2010/0166257 A1 | 7/2010 | Wredenhagen |
| 2010/0199295 A1* | 8/2010 | Katpelly ................ G06N 5/02 725/14 |
| 2010/0235486 A1 | 9/2010 | White et al. |
| 2010/0253838 A1 | 10/2010 | Garg et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0247042 A1 | 10/2011 | Mallinson |
| 2011/0251987 A1 | 10/2011 | Buchheit |
| 2011/0289099 A1 | 11/2011 | Quan |
| 2011/0299770 A1 | 12/2011 | Vaddadi et al. |
| 2012/0017240 A1 | 1/2012 | Shkedi |
| 2012/0054143 A1 | 3/2012 | Doig et al. |
| 2012/0076357 A1 | 3/2012 | Yamamoto et al. |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0294586 A1 | 11/2012 | Weaver et al. |
| 2012/0317240 A1 | 12/2012 | Wang |
| 2012/0324494 A1 | 12/2012 | Burger et al. |
| 2013/0007191 A1 | 1/2013 | Klappert et al. |
| 2013/0042262 A1 | 2/2013 | Riethmueller |
| 2013/0050564 A1 | 2/2013 | Adams et al. |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0198768 A1 | 8/2013 | Kitazato |
| 2013/0202150 A1 | 8/2013 | Sinha et al. |
| 2013/0205315 A1* | 8/2013 | Sinha .................. H04N 21/442 725/14 |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0025837 A1 | 1/2014 | Swenson |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0105567 A1* | 4/2014 | Casagrande ....... H04N 21/4888 386/230 |
| 2014/0123165 A1 | 5/2014 | Mukherjee et al. |
| 2014/0130092 A1 | 5/2014 | Kunisetty |
| 2014/0188487 A1 | 7/2014 | Perez Gonzalez |
| 2014/0193027 A1 | 7/2014 | Scherf |
| 2014/0195548 A1 | 7/2014 | Harron |
| 2014/0196085 A1* | 7/2014 | Dunker ............ H04N 21/23424 725/36 |
| 2014/0201769 A1 | 7/2014 | Neumeier et al. |
| 2014/0201772 A1 | 7/2014 | Neumeier et al. |
| 2014/0201787 A1 | 7/2014 | Neumeier et al. |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |

(56) References Cited

U.S. PATENT DOCUMENTS

| | | | |
|---|---|---|---|
| 2014/0282671 | A1 | 9/2014 | McMillan |
| 2014/0293794 | A1 | 10/2014 | Zhong et al. |
| 2014/0344880 | A1 | 11/2014 | Geller et al. |
| 2015/0026728 | A1 | 1/2015 | Carter et al. |
| 2015/0040074 | A1 | 2/2015 | Hofmann et al. |
| 2015/0100979 | A1 | 4/2015 | Moskowitz et al. |
| 2015/0112988 | A1 | 4/2015 | Pereira et al. |
| 2015/0120839 | A1 | 4/2015 | Kannan et al. |
| 2015/0121409 | A1 | 4/2015 | Zhang et al. |
| 2015/0128161 | A1 | 5/2015 | Conrad et al. |
| 2015/0163545 | A1 | 6/2015 | Freed et al. |
| 2015/0181311 | A1 | 6/2015 | Navin et al. |
| 2015/0229998 | A1 | 8/2015 | Kaushal et al. |
| 2015/0256891 | A1 | 9/2015 | Kim et al. |
| 2015/0302890 | A1 | 10/2015 | Ergen et al. |
| 2015/0382075 | A1 | 12/2015 | Neumeier et al. |
| 2016/0227261 | A1 | 8/2016 | Neumeier et al. |
| 2016/0227291 | A1 | 8/2016 | Shaw et al. |
| 2016/0286244 | A1 | 9/2016 | Chang et al. |
| 2016/0307043 | A1 | 10/2016 | Neumeier |
| 2016/0314794 | A1 | 10/2016 | Leitman et al. |
| 2016/0316262 | A1* | 10/2016 | Chen ................... H04N 21/812 |
| 2016/0330529 | A1* | 11/2016 | Byers ................... H04N 21/251 |
| 2016/0353172 | A1 | 12/2016 | Miller et al. |
| 2016/0359791 | A1 | 12/2016 | Zhang et al. |
| 2017/0017645 | A1 | 1/2017 | Neumeier et al. |
| 2017/0017651 | A1 | 1/2017 | Neumeier et al. |
| 2017/0017652 | A1 | 1/2017 | Neumeier et al. |
| 2017/0019716 | A1 | 1/2017 | Neumeier et al. |
| 2017/0019719 | A1 | 1/2017 | Neumeier et al. |
| 2017/0026671 | A1 | 1/2017 | Neumeier et al. |
| 2017/0031573 | A1 | 2/2017 | Kaneko |
| 2017/0032033 | A1 | 2/2017 | Neumeier et al. |
| 2017/0032034 | A1 | 2/2017 | Neumeier et al. |
| 2017/0134770 | A9 | 5/2017 | Neumeier et al. |
| 2017/0186042 | A1 | 6/2017 | Wong et al. |
| 2017/0311014 | A1 | 10/2017 | Fleischman |
| 2017/0325005 | A1* | 11/2017 | Liassides ............. H04N 21/812 |
| 2017/0353776 | A1 | 12/2017 | Holden et al. |

FOREIGN PATENT DOCUMENTS

| | | |
|---|---|---|
| CN | 101162470 | 4/2008 |
| CN | 1681304 | 7/2010 |
| CN | 102377960 | 5/2012 |
| CN | 101681373 | 9/2012 |
| EP | 248 533 | 8/1994 |
| EP | 1578126 | 9/2005 |
| EP | 1 760 693 A1 | 3/2007 |
| EP | 1504445 B1 | 8/2008 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 | 6/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Apr. 26, 2016 for PCT Application No. PCT/US2016/015681,13 pages.
"How to: Watch from the beginning |About DISH" (Dec. 31, 2014) XP055265764, retrieved on Apr. 15, 2016 from URL:http://about. dish.com/blog/hopper/how-watch-beginning 2 pages.
International Search Report and Written Opinion dated Jun. 24, 2016 for PCT Application No. PCT/US2016/027691, 13 pages.
Gionis et al., "Similarity Search in High Dimension via Hashing", Proceedings of the 25th VLDB Conference, 1999, 12 pages.
Huang, "Bounded Coordinate System Indexing for Real-time Video Clip Search", Retrieved from the Internet:URL:http://staff.itee.uq. edu.aujzxf/papers/TOIS.pdf, Jan. 1, 2009, 32 pages.
Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.
Liu et al., "Near-duplicate video retrieval", ACM Computing Surveys, vol. 45, No. 4, Aug. 30, 2013, pp. 1-23.
International Search Report and Written Opinion dated Oct. 12, 2016 for PCT Application No. PCT/US2016/042522,13 pages.
International Search Report and Written Opinion dated Oct. 11, 2016 for PCT Application No. PCT/US2016/042621, 13 pages.
International Search Report and Written Opinion dated Oct. 20, 2016 for PCT Application No. PCT/US2016/042611,12 pages.
Scouarnec et al., "Cache policies for cloud-based systems:To keep or not to keep", 2014 IEEE 7th International Conference on Cloud Computing, IEEE XP032696624, Jun. 27, 2014, pp. 1-8.
International Search Report and Written Opinion dated Oct. 25, 2016 for PCT Application No. PCT/US2016/042564, 14 pages.
Anonymous; "Cache (computing)" Wikipedia, the free encyclopedia, URL:http://en.wikipedia.org/w/index.phpti tle=Cache(computing) &oldid=474222804, Jan. 31, 2012; 6 pages.
International Search Report and Written Opinion dated Oct. 24, 2016 for PCT Application No. PCT/US2016/042557, 11 pages.
Anil K. Jain, "Image Coding Via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-9 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.

(56) References Cited

OTHER PUBLICATIONS

Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
Extended European Search Report dated Jun. 28, 2019, for European Patent Application No. 19166400.2, 9 pages.
U.S. Appl. No. 14/551,933, "Final Office Action", dated May 23, 2016, 19 pages.
U.S. Appl. No. 14/551,933 , "Non-Final Office Action", dated Oct. 17, 2016, 15 pages.
U.S. Appl. No. 14/551,933 , "Non-Final Office Action", dated Dec. 31, 2015, 24 pages.
U.S. Appl. No. 14/551,933 , "Notice of Allowance", dated Mar. 21, 2017, 8 pages.
U.S. Appl. No. 14/217,039 , "Non-Final Office Action", dated May 23, 2014, 27 pages.
U.S. Appl. No. 14/217,039 , "Final Office Action", dated Nov. 7, 2014, 15 pages.
U.S. Appl. No. 14/217,039 , "Notice of Allowance", dated Jan. 29, 2015, 8 pages.
U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance ", dated Feb. 20, 2015, 51 pages.
U.S. Appl. No. 14/217,094, "Notice of Allowance ", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099 , "First Action Interview Office Action Summary", dated May 9, 2017, 6 pages.
U.S. Appl. No. 15/011,099 , "First Action Interview Pilot Program Pre-Interview Communication", dated Feb. 28, 2017, 5 pages.
U.S. Appl. No. 12/788,721 , "Non-Final Office Action", dated Mar. 28, 2012, 15 Pages.
U.S. Appl. No. 12/788,721 , "Final Office Action", dated Aug. 15, 2012, 22 Pages.
U.S. Appl. No. 12/788,721 , "Notice of Allowance", dated Aug. 15, 2013, 16 Pages.
U.S. Appl. No. 14/763,158 , "Non-Final Office Action", dated Jun. 27, 2016, 16 Pages.
U.S. Appl. No. 14/763,158 , "Final Office Action", dated Sep. 7, 2016, 12 Pages.
U.S. Appl. No. 14/763,158 , "Notice of Allowance", dated Mar. 17, 2016, 8 Pages.
U.S. Appl. No. 14/807,849 , "Non-Final Office Action", dated Nov. 25, 2015, 12 Pages.
U.S. Appl. No. 14/807,849 , "Final Office Action", dated Apr. 19, 2016, 13 pages.
U.S. Appl. No. 14/807,849 , "Non-Final Office Action", dated Feb. 28, 2017, 10 Pages.
U.S. Appl. No. 14/089,003 , "Notice of Allowance", dated Jul. 30, 2014, 24 Pages.
U.S. Appl. No. 12/788,748 , "Non-Final Office Action", dated Jan. 10, 2013, 10 Pages.
U.S. Appl. No. 12/788,748 , "Final Office Action", dated Nov. 21, 2013, 13 Pages.
U.S. Appl. No. 12/788,748 , "Notice of Allowance", dated Mar. 6, 2014, 7 Pages.
U.S. Appl. No. 14/953,994 , "Non-Final Office Action", dated Mar. 3, 2016, 34 Pages.
U.S. Appl. No. 14/953,994 , "Final Office Action", dated Jun. 1, 2016, 36 Pages.
U.S. Appl. No. 14/953,994 , "Notice of Allowance", dated Aug. 31, 2016, 15 Pages.
U.S. Appl. No. 14/807,849 , "Final Office Action", dated Jun. 22, 2017, 10 pages.
U.S. Appl. No. 15/011,099 , "Final Office Action", dated Jul. 24, 2017, 22 pages.
U.S. Appl. No. 15/240,801 , "Non-Final Office Action", dated Aug. 11, 2017, 18 pages.
U.S. Appl. No. 15/240,815 , "Non-Final Office Action", dated Aug. 23, 2017, 15 pages.
U.S. Appl. No. 15/211,345 , "First Action Interview Pilot Program Pre-Interview Communication", dated Sep. 19, 2017, 8 pages.
U.S. Appl. No. 14/807,849 , "Notice of Allowance", dated Nov. 30, 2017, 9 Pages.
U.S. Appl. No. 15/240,801 , "Final Office Action", dated Dec. 22, 2017, 24 pages
U.S. Appl. No. 15/011,099, "Non-Final Office Action", dated Jan. 22, 2018, 23 pages.
U.S. Appl. No. 15/240,815 , "Final Office Action", dated Mar. 2, 2018, 14 pages.
U.S. Appl. No. 15/211,345 , "Final Office Action", dated Mar. 2, 2018, 14 pages.
Extended European Search Report dated Mar. 22, 2018 for European Application No. 15865033.3, 10 pages.
U.S. Appl. No. 15/099,842 , "Final Office Action", dated Apr. 2, 2018, 8 pages.
U.S. Appl. No. 15/210,730, "Notice of Allowance", dated May 23, 2018, 10 pages.
U.S. Appl. No. 15/796,706, "Non-Final Office Action", dated Jun. 26, 2018, 17 pages.
U.S. Appl. No. 15/011,099, "Notice of Allowance", dated Jun. 28, 2018, 12 pages.
U.S. Appl. No. 15/796,698, "Non-Final Office Action", dated Jul. 5, 2018, 15 pages.
U.S. Appl. No. 15/240,801, "Notice of Allowance", dated Aug. 30, 2018, 9 pages.
U.S. Appl. No. 15/211,345, "Non-Final Office Action", dated Sep. 4, 2018, 13 pages.
U.S. Appl. No. 15/099,842, "Notice of Allowance", dated Sep. 7, 2018, 10 pages.
U.S. Appl. No. 15/240,815, "Notice of Allowance", dated Sep. 12, 2018, 9 pages.
U.S. Appl. No. 15/290,848 , "First Action Interview Office Action Summary", dated Nov. 2, 2018, 5 pages.
U.S. Appl. No. 15/796,692, "Notice of Allowance", dated Dec. 5, 2018, 8 pages.
U.S. Appl. No. 15/796,698, "Notice of Allowance", dated Dec. 20, 2018, 8 pages.
U.S. Appl. No. 15/796,706, "Notice of Allowance", dated Jan. 11, 2019, 9 pages.
U.S. Appl. No. 15/211,508, "Non-Final Office Action", dated Jan. 10, 2019, 20 pages.
U.S. Appl. No. 15/211,492, "Non-Final Office Action", dated Jan. 11, 2019, 19 pages.
U.S. Appl. No. 16/141,598, "First Action Interview Office Action Summary", dated Jan. 11, 2019, 8 pages.
U.S. Appl. No. 15/290,848, "Non-Final Office Action", dated Mar. 5, 2019, 5 pages.
U.S. Appl. No. 15/211,991, "Non-Final Office Action", dated Feb. 26, 2019, 8 pages.
U.S. Appl. No. 15/211,345, "Notice of Allowance", dated Mar. 20, 2019, 6 pages.

(56) References Cited

OTHER PUBLICATIONS

U.S. Appl. No. 16/210,796, "Non-Final Office Action", dated Mar. 22, 2019, 7 pages.
U.S. Appl. No. 16/141,598, "Notice of Allowance", dated Apr. 25, 2019, 11 pages.
U.S. Appl. No. 15/211,508, "Final Office Action", dated Jun. 20, 2019, 20 pages.
U.S. Appl. No. 15/211,492, "Final Office Action", dated Jun. 20, 2019, 18 pages.
U.S. Appl. No. 16/210796, "Notice of Allowance", dated Jul. 11, 2019, 9 pages.
U.S. Appl. No. 16/214,875, "Non-Final Office Action", dated Jul. 29, 2019, 12 pages.
U.S. Appl. No. 15/211,991, "Final Office Action", dated Oct. 31, 2019, 9 pages.

\* cited by examiner

METHODS FOR IDENTIFYING VIDEO SEGMENTS AND DISPLAYING OPTION TO VIEW FROM AN ALTERNATIVE SOURCE AND/OR ON AN ALTERNATIVE DEVICE

CROSS-REFERENCE TO RELATED APPLICATIONS

This is a continuation of U.S. patent application Ser. No. 16/141,598, filed Sep. 25, 2018, which is a continuation of U.S. patent application Ser. No. 15/011,099, filed Jan. 29, 2016, which claims the benefit of U.S. Provisional Application No. 62/110,024, filed Jan. 30, 2015, both of which are incorporated herein by reference in their entirety for all purposes. This application is related to U.S. patent application Ser. No. 14/089,003, filed Nov. 25, 2013, which claims the benefit of U.S. Provisional Application No. 61/182,334, filed May 29, 2009 and the benefit of U.S. Provisional Application No. 61/290,714, filed Dec. 29, 2009, all of which are hereby incorporated by reference in their entirety. This application is also related to U.S. patent application Ser. No. 12/788,748, filed May 27, 2010, U.S. patent application Ser. No. 12/788,721, filed May 27, 2010, and U.S. patent application Ser. No. 14/217,075, filed Mar. 17, 2014, all of which are hereby incorporated by reference in their entirety.

FIELD

The present disclosure relates generally to identifying video content being displayed by a television system and providing options related to the video content. For example, various techniques and systems are provided for identifying a video segment being displayed, and providing an option to switch to an alternative or related version of the video program that includes the video segment.

BACKGROUND

Advancements in fiber-optic and digital transmission technology have enabled the television programming distribution industry to rapidly increase channel capacity and provide some degree of interactive television (ITV) services due in large part to the industry combining the increased carriage capacity of their respective networks with the processing power of contemporary consumer computer systems, such as Smart Televisions (TVs), set-top boxes (STB), or other devices.

SUMMARY

Certain aspects and features of the present disclosure relate to identifying a video segment being displayed, and providing an option to switch to an alternative or related version of the video program that includes the video segment. For example, techniques and systems are described for identifying video segments displayed on a screen of a television system, and to systems and methods for providing contextually-targeted content or contextually-related alternative content to a television system based on the identification of a video segment.

In some examples, a video segment of a currently viewed program (called the original program) can be identified by deriving data from television signals and comparing the information to data stored in a reference database. In some cases, this feature can be used to extract a reaction of a viewer (e.g., changing the channel, or the like) to a specific video segment and to report the extracted information as statistical data-metrics to interested parties. In some examples, contextually-targeted or contextually-related content can be provided to the television system presenting the viewer with an option to view the currently displayed program off-line in an on-demand format. The viewer, thus, can start over viewing a program that had already begun and for which the viewer perhaps missed a segment. In some cases, upon selection of the option to start over, the television system can present the viewer with an option to select a different format for the program (e.g., a higher resolution version of the program, a 3D video version of said program, or the like). In some instances, fewer television third party content items can be provided with the on-demand program, and the viewer may be informed of the fewer third party content. In some examples, the system can substitute certain third party content that are estimated to be of interest to the demographics of the viewer in place of certain third party content that is part of the original program.

According to at least one example, a matching server may be provided for identifying video content being displayed by a television system. The matching server includes one or more processors. The matching server further includes a non-transitory machine-readable storage medium containing instructions which when executed on the one or more data processors, cause the one or more processors to perform operations including: receiving video data of a video segment being displayed by the television system, wherein the video segment includes at least a portion of a video program; identifying the video segment being displayed by the television system, wherein identifying the video segment includes comparing the video data of the video segment with stored video data to find a closest match; determining contextual content, wherein the contextual content is contextually related to the identified video segment, and wherein the contextual content includes an option to switch to an alternative or related version of the video program from a video server; and providing the contextual content to the television system.

In another example, a computer-implemented method is provided that includes: receiving, by a computing device, video data of a video segment being displayed by a television system, wherein the video segment includes at least a portion of a video program; identifying the video segment being displayed by the television system, wherein identifying the video segment includes comparing the video data of the video segment with stored video data to find a closest match; determining contextual content, wherein the contextual content is contextually related to the identified video segment, and wherein the contextual content includes an option to switch to an alternative or related version of the video program from a video server; and providing the contextual content to the television system.

In another example, a computer-program product tangibly embodied in a non-transitory machine-readable storage medium of a computing device may be provided. The computer-program product may include instructions configured to cause one or more data processors to: receive video data of a video segment being displayed by a television system, wherein the video segment includes at least a portion of a video program; identify the video segment being displayed by the television system, wherein identifying the video segment includes comparing the video data of the video segment with stored video data to find a closest match; determine contextual content, wherein the contextual content is contextually related to the identified video segment, and wherein the contextual content includes an option to switch to an alternative or related version of the video program from a video server; and provide the contextual content to the television system.

According to at least one other example, a television system may be provided that includes one or more processors. The television system further includes a non-transitory machine-readable storage medium containing instructions which when executed on the one or more data processors, cause the one or more processors to perform operations including: displaying a video segment; transmitting video data of the video segment being displayed, wherein the video segment includes at least a portion of a video program, wherein the video data is addressed to a matching server, and wherein the video data of the video segment is compared with stored video data to identify the video segment being displayed; receiving contextual content, wherein the contextual content is contextually related to the identified video segment, and wherein the contextual content includes an option to switch to an alternative or related version of the video program from a video server; and displaying the contextual content on a screen.

In another example, a computer-implemented method is provided that includes: displaying, by a television system, a video segment; transmitting video data of the video segment being displayed, wherein the video segment includes at least a portion of a video program, wherein the video data is addressed to a matching server, and wherein the video data of the video segment is compared with stored video data to identify the video segment being displayed; receiving contextual content, wherein the contextual content is contextually related to the identified video segment, and wherein the contextual content includes an option to switch to an alternative or related version of the video program from a video server; and displaying the contextual content on a screen.

In another example, a computer-program product tangibly embodied in a non-transitory machine-readable storage medium of a television system may be provided. The computer-program product may include instructions configured to cause one or more data processors to: display a video segment; transmit video data of the video segment being displayed, wherein the video segment includes at least a portion of a video program, wherein the video data is addressed to a matching server, and wherein the video data of the video segment is compared with stored video data to identify the video segment being displayed; receive contextual content, wherein the contextual content is contextually related to the identified video segment, and wherein the contextual content includes an option to switch to an alternative or related version of the video program from a video server; and display the contextual content on a screen In some embodiments, selection of the option to switch to the alternative or related version of the video program causes the television system to receive a version of the video program starting from the beginning of the video program.

In some embodiments, the contextual content is displayed by the television system while the video program is displayed on a video screen of the television system. In some embodiments, the contextual content includes a graphical interface with the option to switch to the alternative or related version of the video program.

In some embodiments, the video server includes a video-on-demand server.

In some embodiments, the contextual content further includes an option to select from a plurality of video program choices, and wherein the plurality of video program choices include video control capability, display format of the video content, or reduced commercial messaging.

In some embodiments, the television system requests the alternative or related version of the video content from the video server when the option to switch to the alternative or related version of the video program is selected.

In some embodiments, the television system is connected with a third party content server when the option to switch to the alternative or related version of the video program is selected, wherein the television system connects with the third party server to obtain third party content from the third party content server at a specified time interval of the alternative or related version of the video program.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
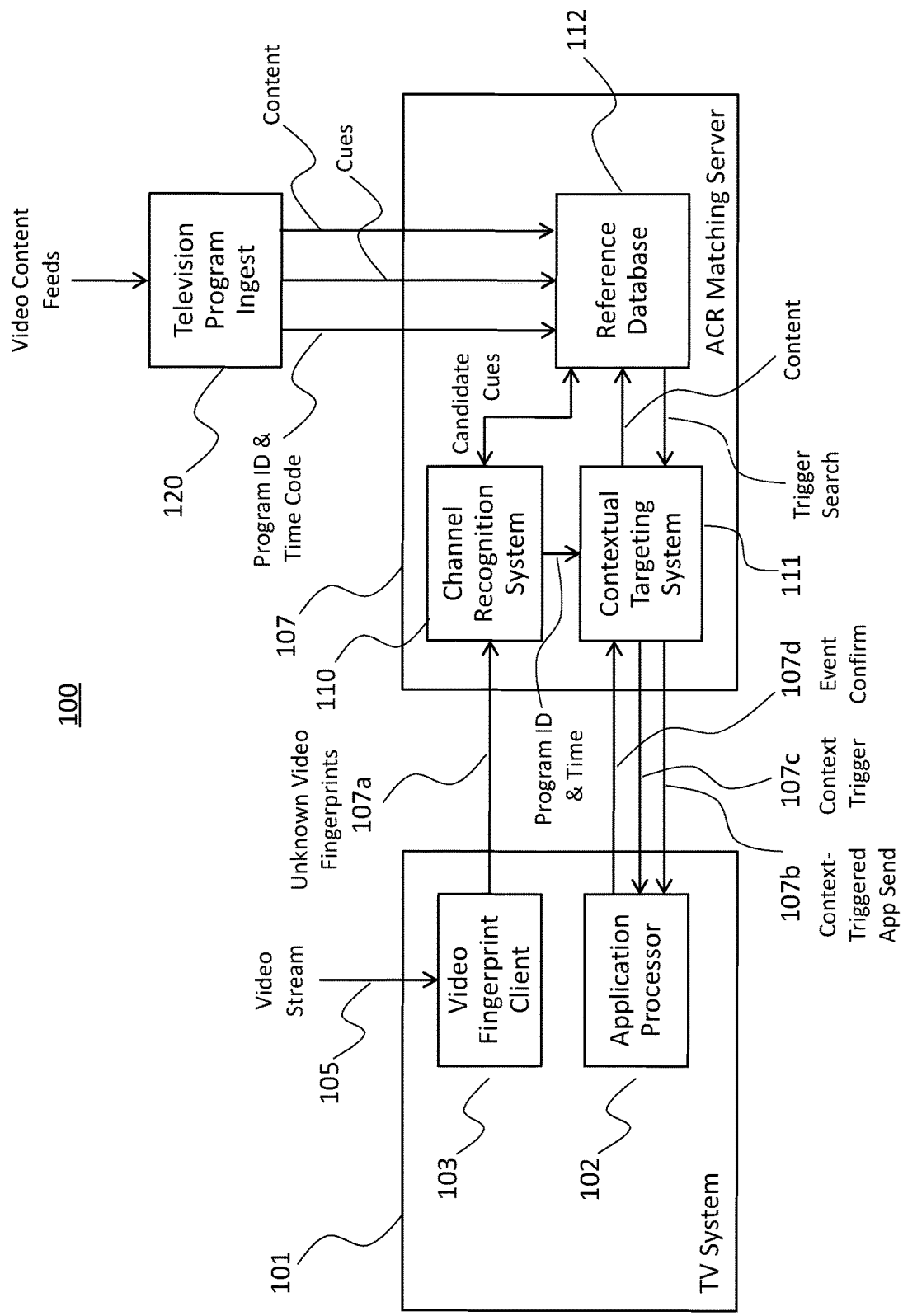
FIG. 1 is a block diagram of an example of an interactive television environment.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

As described in further detail below, certain aspects and features of the present disclosure relate to identifying a video segment being displayed, and providing an option to switch to an alternative or related version of the video program that includes the video segment. For example, techniques and systems are described for identifying video segments displayed on a screen of a television system, and to systems and methods for providing contextually-targeted content or contextually-related alternative content to a television system based on the identification of a video segment The technology of interactive television (ITV) has been developed in an attempt to enable TV Systems to serve as a two-way information distribution mechanism in a manner approximating certain aspects of the World Wide Web. Features of an ITV service accommodate a wide variety of marketing, entertainment, and educational capabilities such as allowing a user to get more information about a product or service, order said product or service, compete against contestants in a game show, and the like. In many instances, the interactive functionality is controlled by a set-top box (STB) that executes an interactive program created for inclusion with the TV broadcast. The interactive functionality can be displayed on the TV's screen and may include icons or menus to allow a user to make selections or otherwise interact with the contextually-related content via the TV's remote control or a keyboard linked to the TV.

In some cases, the interactive content can be incorporated into the broadcast stream (also referred to herein as the "channel/network feed"). In the present disclosure, the term "broadcast stream" refers to the broadcast signal received by a television, regardless of the method of reception of that signal, e.g., by TV antenna, satellite dish, cable TV connection, Internet delivery or any other method of signal transmission. One technique for incorporating interactive content into a broadcast stream is the insertion of timed data triggers into the broadcast stream for a particular program. Program content in which triggers have been inserted is sometimes referred to as enhanced program content or as an enhanced TV program. Triggers may be used to alert a STB or a processor in a Smart TV that interactive content is available that is associated with said television programming. The trigger may contain information about available content as well as the memory location of the content. A trigger may also contain user-perceptible text that is displayed on the screen, for example, at the bottom of the screen, which may prompt the user to perform some action or choose amongst a plurality of options.

Connected TVs are TVs that are connected to the Internet via a viewer's home network (wired and/or wireless). Connected TVs can run an application platform such as Google's Android, or other proprietary platforms enabling interactive, smartphone or tablet-like applications to run on these TVs. The basic common features of such connected TV platforms are: (1) a connection to the Internet; and (2) the ability to run software applications with graphics from said applications overlaid on or occupying all of the TV display. Many models of TVs with this capability have been in the market in large quantities since 2009 and virtually all new TVs now support these features.

Currently, few TVs (Internet connected or otherwise) have access to metadata about what the viewer is watching at the moment, nor who the viewer is from the perspective of providing that viewer with programming or commercial opportunities customized for them. While some information about a content offering is available in bits and pieces in the content distribution pipeline, by the time a television show reaches the viewers' screen over typical legacy distribution systems, such as cable and satellite TV, all information other than video and audio has been lost.

Many efforts have been underway for well over a decade to encode the identification information, also known as metadata, into entertainment and third party content in the form of watermarks applied to the audio or video portions of said programming in a way that can survive compression and decompression. Many commercial services and products are available for applying watermarking information to audio and video content but no means or method has been adopted for widespread use. Even once these watermarking means are standardized, reliable and generally available, they are forecast to have the ability to identify a point in a television segment that is being displayed on a certain TV system to a time resolution of tens of seconds. Said time resolution is far course than is provided by certain embodiments of the current disclosure.

As a result, in legacy distribution systems, the TV system does not have the means to know what TV channel or show the viewer is watching at the present moment nor what the show is about. The channel and show information as seen on a television screen by a viewer is currently overlaid by the STB from sometimes incomplete information. This barrier is the result of the fundamental structure of the TV content distribution industry.

Despite cable system operators' STBs and Smart TVs supporting ever more-sophisticated on-screen electronic program guides (EPGs), rather than searching for a specific program or program type, many TV viewers still "channel surf" in the sense of randomly or semi-randomly browsing currently-available programming, either on the EPG or by physically changing channels. If the programming being viewed was not already captured by a user's DVR, then joining already playing content, particularly when it is in a longer format such as movies, sporting events, or reality programs, can be less than satisfying. Meanwhile, finding that same movie or long-format program playing from the beginning at another time or on another channel is a complex process or may not even be possible.

To increase the quality of the viewing experience by mitigating the problem of wanting to view a video program that is already in progress, what is then needed is a system that enables a simple user interface (UI) gesture by the viewer such as, by way of example only, clicking on an on-screen graphic of a button or the like conveying a command to "Start Over" or the like. This gesture would cause a request to be communicated to a central server means to automatically switch the viewer from, for example, a live television program to a customized Video-on-Demand (VoD) service which restarts the displayed movie, sporting event, or other programming content from the beginning or continues from the currently viewed time in the program. Restarting of the content can be referred to as an alternative mode. The restarting of the movie can occur immediately or can be delayed. Once viewing in the alternative mode, the user is free to rewind or pause and the like. Other options could include, by way of example and without limitation, offering the just-selected VoD programming in a higher than normal resolution or in a 3D format, or other enhanced state, with fewer or no commercial breaks, or with specific commercials inserted that are more relevant to the demographics or previous shopping or browsing behavior of said viewer. In yet another embodiment, said programming from the VoD source could be viewed by said user on another viewing device. This would make the consumption of content and the personalization of commercial messages closer to the means by which video content and commercial offerings are already available on the Internet.

Embodiments of the present disclosure are directed to systems and methods for identifying video segments as they are displayed on a screen of a television (TV) system (e.g., in a user's or consumer's home). In particular, the resulting data identifying the video segment currently displaying on the TV system can be used to enable the capture and appropriate response to a TV viewer's reaction, such as requesting that the programming be restarted from its beginning, therefore enabling the seamless switching of a viewer from a conventional, real-time broadcast environment delivered over the cable system's network to a custom-configured, video on demand (VoD) product delivered over an Internet connection or over a cable TV network's managed channels. The VoD programming could also include the substitution of more relevant third party content (e.g., commercial or advertisement) messages, among other options.

As used herein, the term "Television System" includes, but is not limited to, a television device such as television receiver or an Internet-connected TV (also known as "Smart TVs"). Equipment can be incorporated in, or co-located with, the television system, such as a set-top box (STB), a digital video disc (DVD) player or a digital video recorder (DVR). As used herein, the term "television signals" includes signals representing video and audio data which are broadcast together (with or without metadata) to provide the picture and sound components of a television program or television commercial. As used herein, the term "metadata" refers to information (data) about or relating to the video/audio data in television signals.

In accordance with some embodiments, the video segment is identified by sampling (e.g., at fixed intervals, such as five times per second, ten times per second, fifteen times per second, twenty times a second, or any other suitable interval) a subset of the pixel data being displayed on the screen, or associated audio data, and then finding similar pixel or audio data in a content database. In accordance with other embodiments, the video segment is identified by extracting audio or image data associated with such video segment and then finding similar audio or image data in a content database. In accordance with alternative embodiments, the video segment is identified by processing the audio data associated with such video segment using known automated speech recognition techniques then searching a keyword database for matching words and then further processing said matched words in a context-sensitive natural language processing means. In accordance with further alternative embodiments, the video segment is identified by processing metadata associated with such video segment.

In some embodiments, systems and methods are described for providing contextually targeted content (also referred to as contextual content) to an interactive television system. The contextual targeting is based on identification of the video segment being displayed, and is also based on a determination concerning the playing time or offset time of the particular portion of the video segment being currently displayed. The terms "playing time" and "offset time" will be used interchangeably herein and refer to a time which is offset from a fixed point in time, such as the starting time of a particular television program or commercial.

In some embodiments, systems and methods are described that detect what is playing on a connected TV, determine the subject matter of what is being played, and interact with the television system (and viewer) accordingly. In particular, the technology disclosed herein overcomes the limited ability of interactive TVs to strictly be responsive only to predetermined contextually related content from a central server means via the Internet, and enables novel features including the ability to provide instant access to video-on-demand versions of content, and providing the user with the option to view video programming in higher resolutions or in 3D formats if available, and with the additional ability to restart a program from its beginning and/or to fast forward, pause, and rewind said programming. The systems and methods also enable having some or all third party messages included in the now on-demand programming customized, by way of example only and without limitation, with respect to the viewer's location, demographic group, or shopping history, or to have the commercials reduced in number or length or eliminated altogether to support various business models.

In accordance with some embodiments, the video segment is identified and the offset time is determined by sampling a subset of the pixel data and/or associated audio data as the pixel data is displayed on the screen or the audio data is played through the audio system of the TV, and then finding similar pixel or audio data in a content database. In accordance with other embodiments, the video segment is identified and the offset time is determined by extracting audio or image data associated with said video segment and then finding similar audio or image data in a content database. In accordance with alternative embodiments, the video segment is identified and the offset time is determined by processing the audio data associated with such video segment using known automated speech recognition techniques. In accordance with further alternative embodiments, the video segment is identified and the offset time is determined by processing metadata associated with such video segment.

As will be described in more detail below, the software for identifying video segments being viewed on a connected TV and, optionally, determining offset times, can reside in a non-transitory medium of the computing means of a television system of which the connected TV is a component. In accordance with alternative embodiments, one part of the software for identifying video segments resides on the television system and another part resides on a remote computer server means connected to the television system via the Internet. Other aspects of the invention are disclosed below.

FIG. 1 is a block diagram of an example of an interactive television environment 100 that can perform automated content recognition to identify video content being displayed by a television system (a viewing event), and can provide content that is contextually related to the identified video content. The interactive television environment 100 includes an interactive television system 101 that can be part of a smart TV and that is connected to a matching server 107 system that processes video data of one or more video segments. One of ordinary skill in the art will understand that the matching server 107 can include one server, or can include multiple servers. A server can include an actual machine running matching algorithms, or can include one or more virtual machines running matching algorithms.

The video data of the one or more video segments can be used to generate video fingerprints 103. For example, the video fingerprints 103 are generated by processing video data from a video frame buffer of the smart TV, and sending the video data to the matching server system 107. The video segment recognition system 110 (or channel recognition system 110) receives the video data or samples (which can be referred to as cues) from smart TV and compares the cues to a reference database 112 of video samples (or video data). In some examples, the video data or video samples can include pixels of video frames. The video samples in the reference database 112 of can be received from the television program ingest engine 120.

Successful matches of video segments against the video samples 112 triggers the signaling of identified video segment information and respective client identification to contextual targeting system 111 for further processing of the viewing event. The further processing can include sending a trigger to the respective client TV system. The trigger invokes one or more software applications resident in the client TV system (e.g., a processor or machine-readable storage medium), such as a context-sensitive or context-targeted application. The one or more software applications can then present information to the viewer in the form of a graphical interface, such as an on-screen graphical interface in a window displayed over the video content being displayed on the TV system. For example, the information can be displayed by the TV system while the video program is displayed on a video screen of the television system. Various information can be presented by the graphical interface. For example, the information may supplement a substitute item of third party content for a third party content item (e.g., a television commercial, or other third party content) currently being displaying on the TV system. In another example, the information may include additional information about a currently displayed TV program. In another example, the information may include an option to switch to an alternative or related version of the video program from a video server. For instance, the option may include an offer to watch a currently displayed video program from the beginning by means of a video-on-demand server.

Figure 2A:
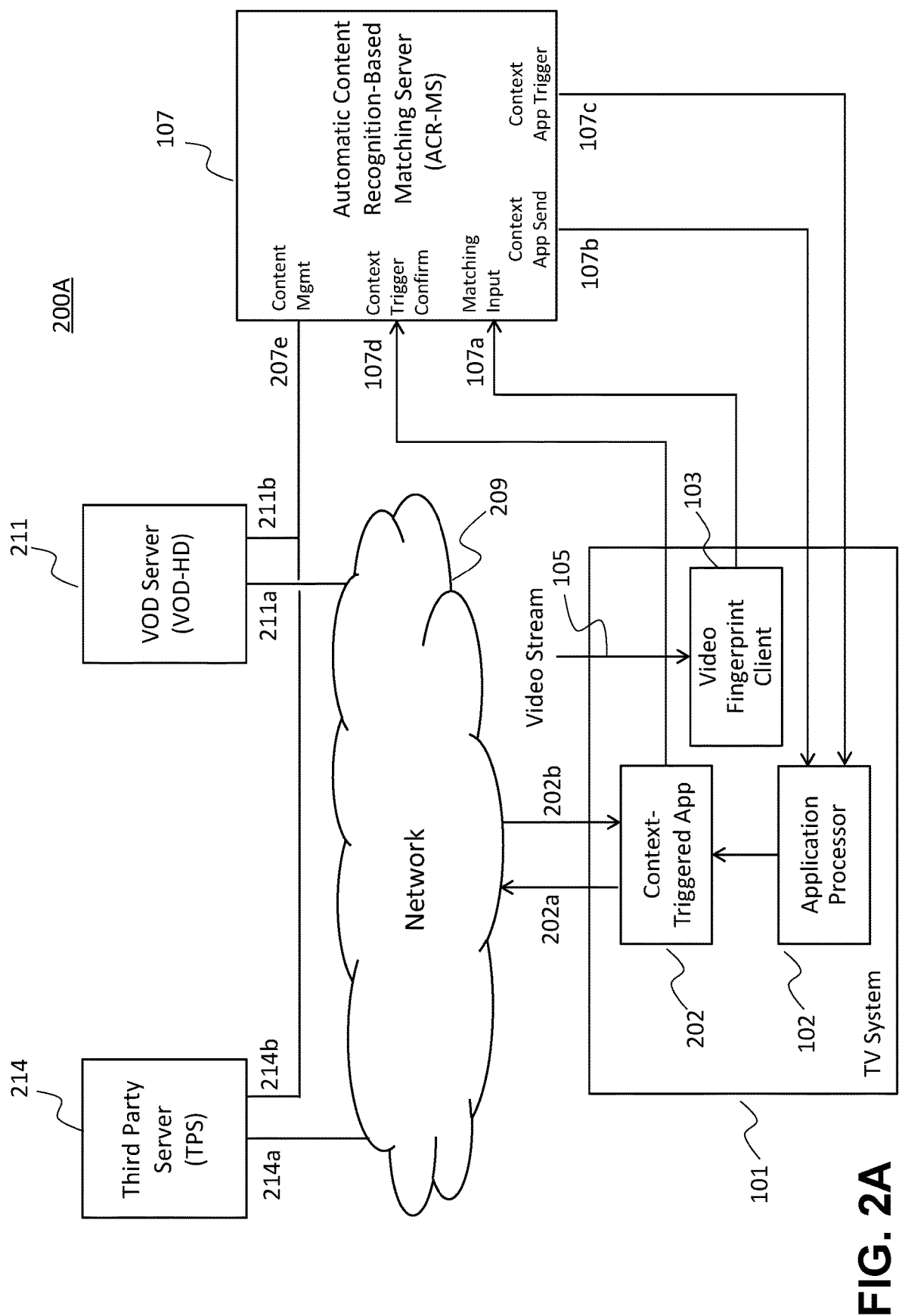
FIG. 2A is a block diagram of another example of an interactive television environment.

FIG. 2A is a block diagram of another example of an interactive television environment 200A. The interactive television environment 200A includes an example configuration of the TV system 101 that is connected to the automatic content recognition-based matching server 107. The TV system 101 is supplied with content by a Video-on-Demand (VoD) Content server 211 and a third party content server 214, both of which are also in two way communication with the client TV system 101 over the Internet using, for example, communication links 202a and 202b. The third party content server 214 can provide third party content, such as one or more items of commercial content. In one instance of the invention, the user is presented with a graphical interface (e.g., a window, a banner overlay, or the like) on a TV display or screen of the TV system 101. The graphical interface can present information that is context dependent upon the video segment as detected by the matching server 107. For example, once the matching server 107 finds a closest match between a video segment being displayed and a video segment in the content database, a trigger causing the graphical interface to be presented can be sent from the matching server 107 to the TV system 101. If the video segment is also available as a video-on-demand product from the VoD content server 211, the user is offered the option to "start over" and view a version of the program being viewed from the beginning, which will then be under full VoD control.

When the trigger is received and a user selects the option to receive an alternative or related version of the program (e.g., to start the program over, select a similar program in a different format), the TV system 101 can establish one or more communication links with the VoD server 211 (or the VoD server 312 described below). The communication links can include connections 202a, 202b, 211a, and 211b. In one example, a communication link can include one or more Internet or web-based communication links, such as a TCP link to setup and control the communication channel and/or a UDP link for streaming content from VoD server 211 or 312 to the TV system 101. The TV system 101 can communicate directly with the VoD server 211 or 312, and can obtain the alternative or related version of the program without being required to go through a central server (e.g., a cable provider, the matching server 107, or other server). Accordingly, an Internet-based communication link is established between the TV system 101 and the VoD server 211 or 312 instead of through a cable provider head-end, allowing web-based rules and traffic and monitoring to be used. The VoD server 211 or 312 and the third party server 214 can utilize information provided in the direct Internet-based communications from the TV system 101 to select contextually related third party content or other information that is known to be of interest to the user of the TV system 101 (e.g., a viewer of content presented by the TV system 101). For example, the VoD server 211 or 312 and the third party server 214 can take advantage of IP traffic sent from the TV system 101 to collect a cookie pool or web history (e.g., browsing history of website usage by the user) of the user. In one instance, the TV system's IP address can be used to obtain the cookie pool, and the third party server 214 can provide third party content to the VoD server 211 is are targeted based on the cookies.

By using automated content recognition to identify a portion of original content that is being viewed at a particular point in time, the identification of viewed original content is disconnected from the provider of content. As a result, any content being viewed can be identified, including over-the-top content, cable-provided content, or other content that provides video programs to a viewer. For example, regardless of the source of the content (e.g., from a cable provider, a streaming service, or the like), the current program being viewed can be identified, and the TV system 101 can obtain a related program from the VoD server 211 or 312 without involving the provider or the source of the original content.

In some embodiments, the application processor 102 can detect remote control commands performed by the user through a remote control. The remote control commands can include any suitable command, such as a command to start a video segment from the beginning, a rewind command, a fast-forward command, a pause command, or other suitable functions or commands. The application processor 102 can communicate the commands through communication link 211*a* to control the VoD server 211. In other embodiments, the VoD commands can be processed by the matching server 107 and relayed on behalf of the respective user to the VoD content server 211. In yet a further embodiment, a third party server 214 can be instructed to insert third party content (e.g., television commercial) in coordination with VoD content server 211 in order to substitute for third party content items that were part of the video program when originally broadcast.

Figure 2B:
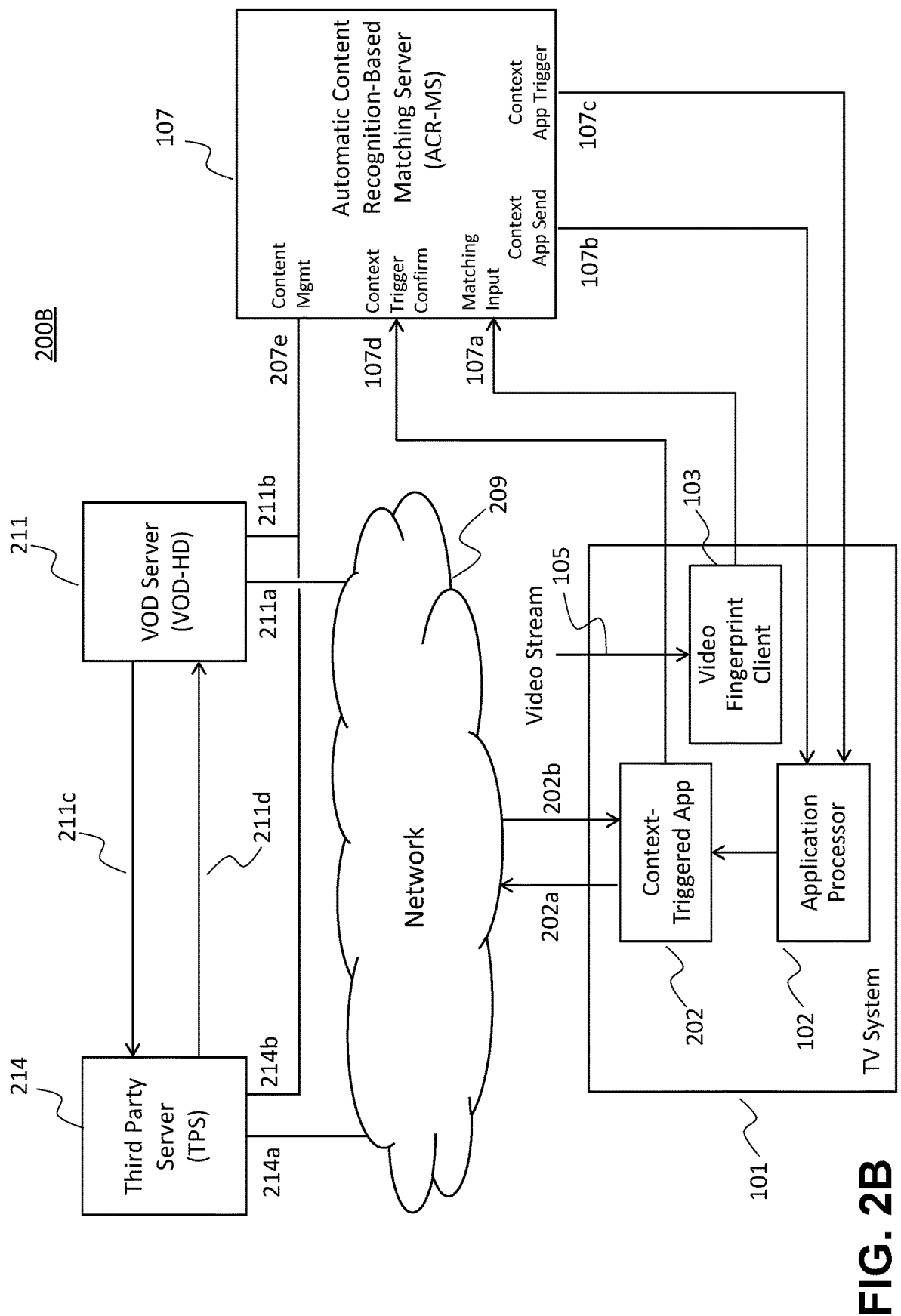
FIG. 2B is a block diagram of another example of an interactive television environment.

FIG. 2B is a block diagram of another example of an interactive television environment 200B. The interactive television environment 200B includes an example configuration that is similar to that as depicted in FIG. 2A, with the addition of direct communication links 211*c* and 211*d* between VoD content server 211 and the third party content server 214. The direct communication links 211*c* and 211*d* enable a control system of the VoD content server 211 to perform seamless substitution of commercial messages or other third party content in an on-demand video stream at predetermined times in the video program provided by the VoD server 211.

Figure 2C:
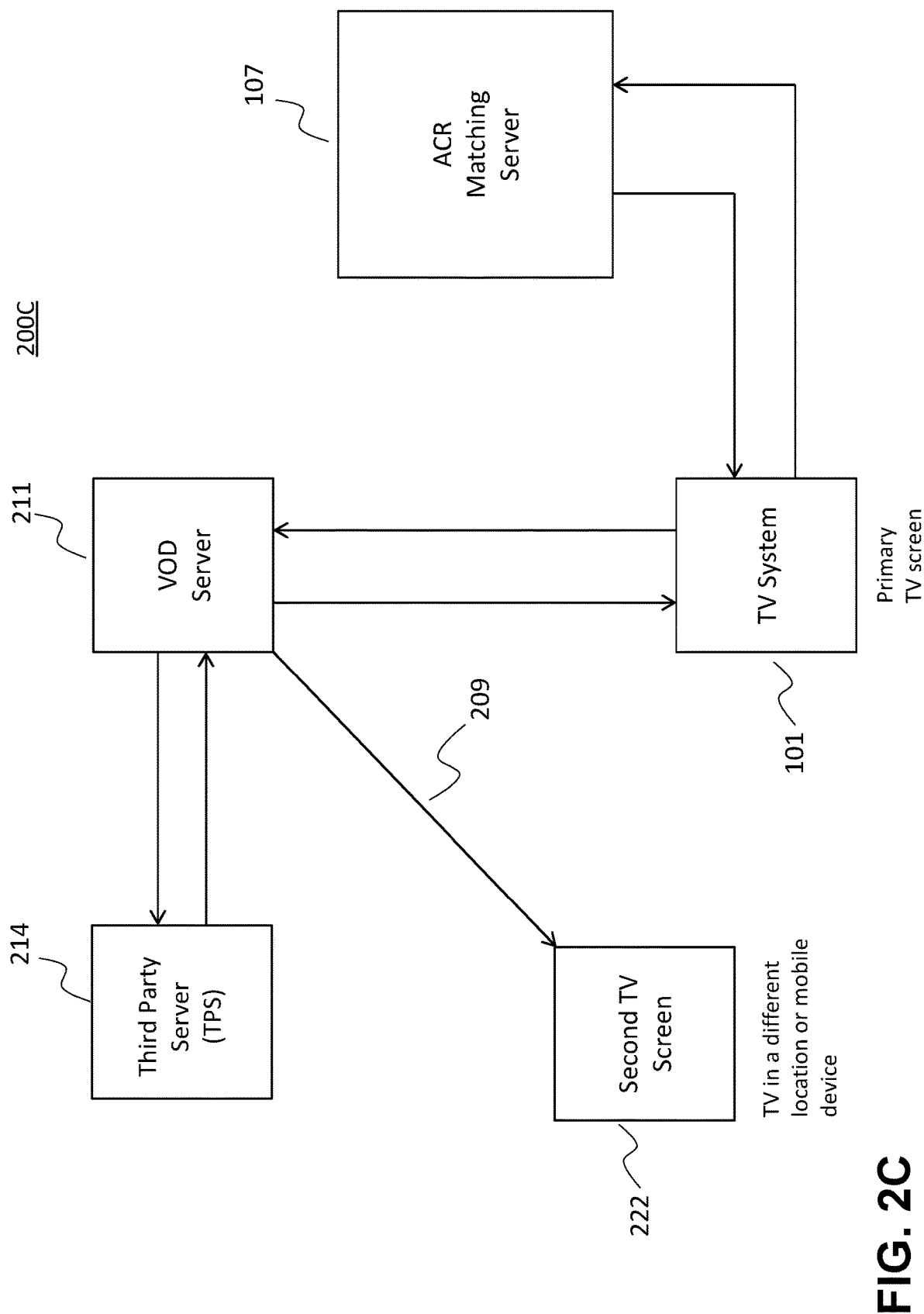
FIG. 2C is a block diagram of an example of an interactive television environment with an alternative viewing device.

FIG. 2C is a block diagram of another example of an interactive television environment 200C including an alternative viewing device. The interactive television environment 200C enables a user to view the VoD programming from the VoD server 211 on an alternative viewing device. The alternative viewing device can include another network connected smart TV system, a mobile device, a desktop computer, or the like. In one example, the VoD programming from the VoD server 211 can be viewed on the alternative viewing device after the user selects the graphic option to enable the "start over" function.

Figure 3:
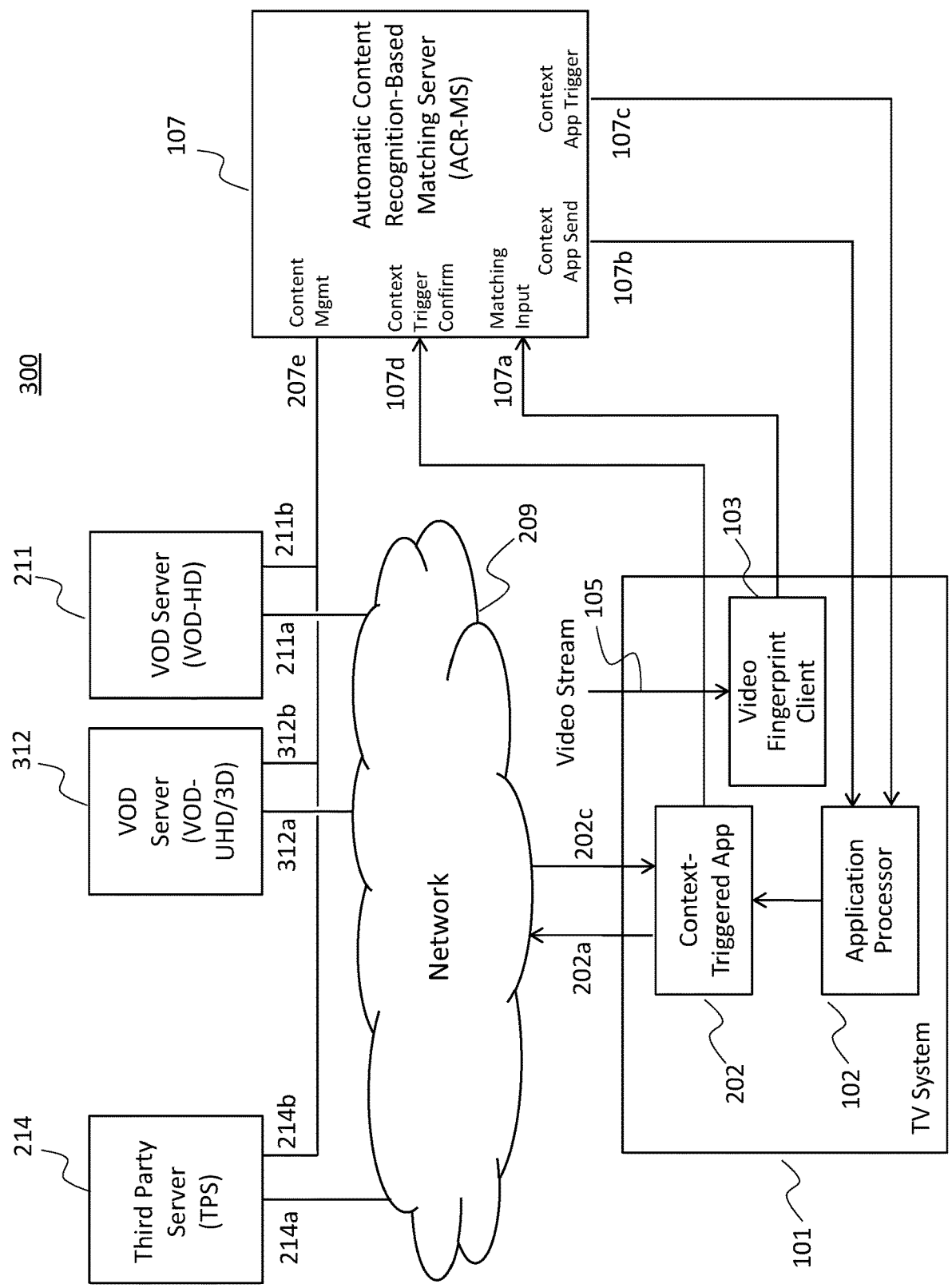
FIG. 3 is a block diagram of an example of an interactive television environment with alternative content options.

FIG. 3 is a block diagram of an example of an interactive television environment 300 with alternative content options. For example, the environment 300 is similar to the environment 200A, with the addition of a server 312 providing alternative formats of the available content from server 312. In some examples, alternative formats that can be selected by the user include receiving the video content at a higher resolution (e.g., at a 4 k or ultra-high-definition (UHD) resolution using a 4 k television), in a 3D video mode, in a high definition format (in the event the original video content was displayed in standard definition format), or the like.

Figure 4:
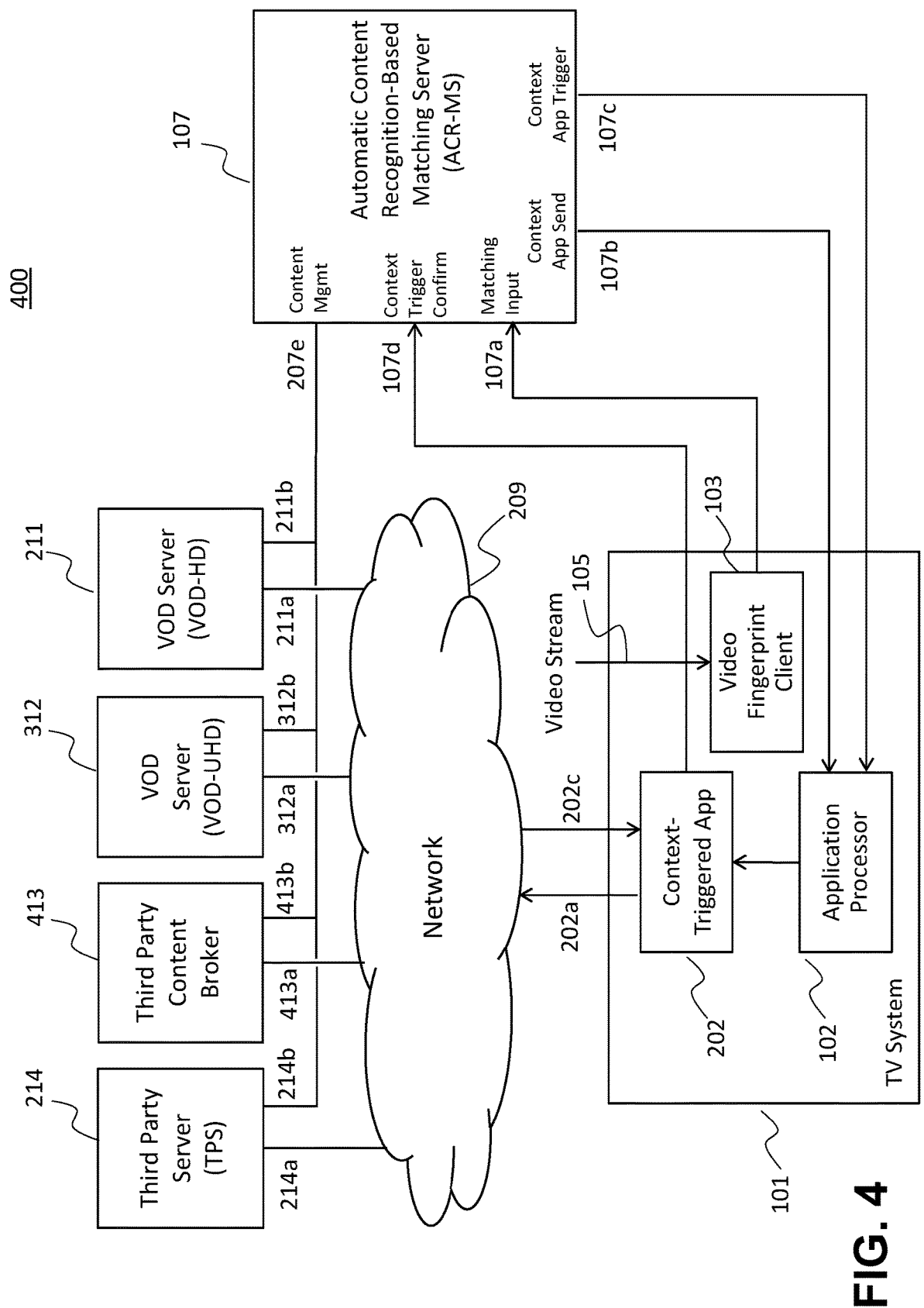
FIG. 4 is a block diagram of another example of an interactive television environment with alternative content options.

FIG. 4 is a block diagram of another example of an interactive television environment 400 with alternative content options. For example, the environment 400 is similar to the environment 300, with the addition of a third party content broker server 413. The third party content broker server 413 can provide a third party content brokering system allowing third-party networks or third party content providers to bid for, and upon winning, provide third party message content that may be substituted for the third party content messages in the video content from video server 211 or 312.

Figure 5:
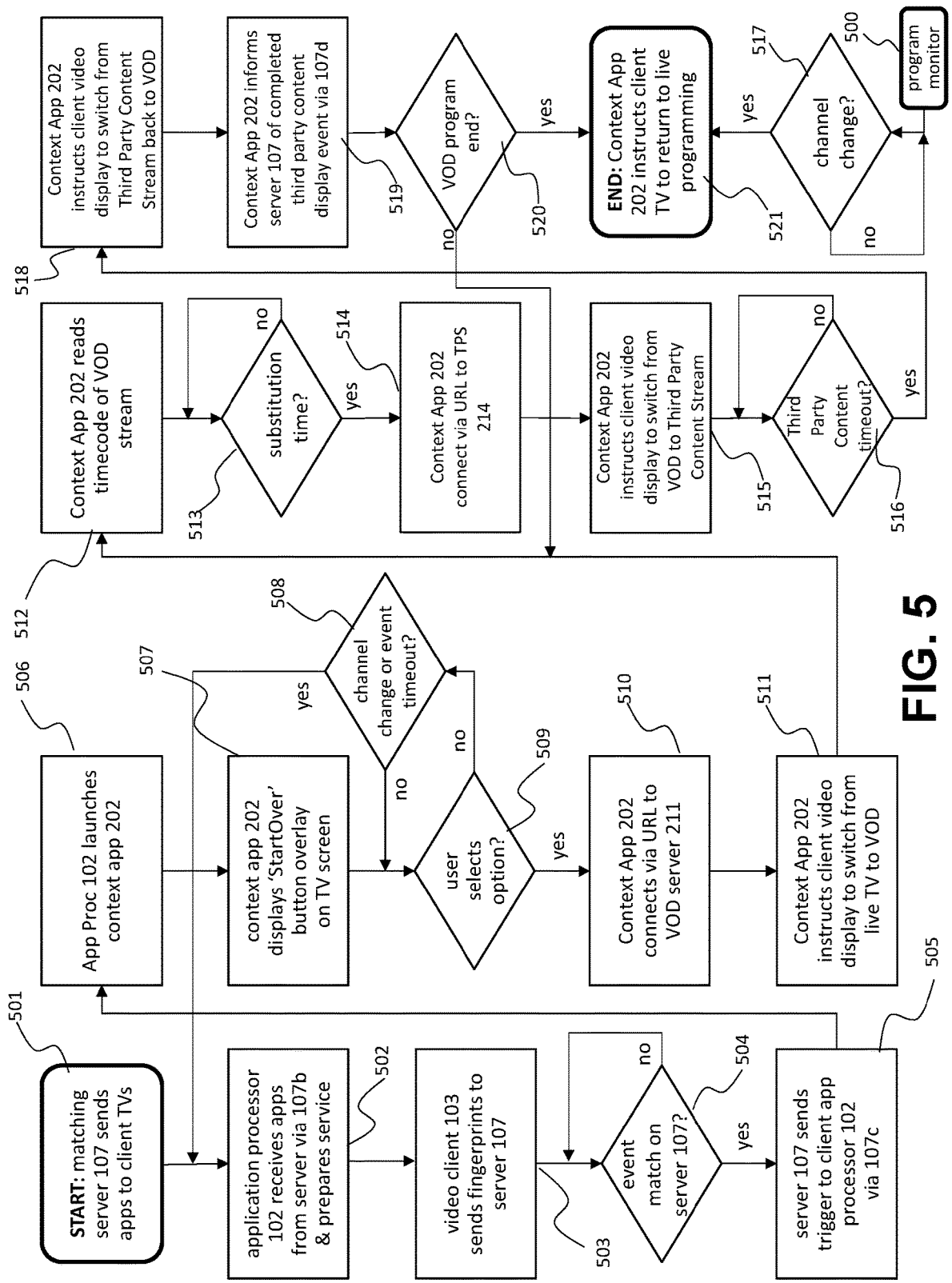
FIG. 5 is a flowchart illustrating an embodiment of a process of identifying video content being displayed and providing related content.

FIG. 5 is a flowchart summarizing steps performed by an example process implemented by any of the systems shown in the previous figures. At step 501, the server 107 can provide context-sensitive applications to the TV system 101 in advance of the occurrence of one or more context-sensitive events. At 502, the application processor of the TV system 101 receives the context-sensitive applications from the matching server 107 over connection 107*b*, and prepares the one or more services offered by the applications. A context-sensitive application (also referred to as context-targeted application) contains embedded address information to access and enable video substitution from remote servers 211 and 312. The access occurs when the content matching system 107 identifies appropriate video content displaying on TV system 101 (based on matching video data to stored video data, as previously described). For example, at step 503, the video fingerprint client 103 can send one or more fingerprints to the matching server 107 over connection 107*a*. At step 504, the matching server 107 can detect whether there is an event match between a received fingerprint (a cue or video data of a video segment) and stored video data. In the event no match is found the matching server 107 continues to process fingerprints until a match is found. If a match is found, the matching server 107 sends a trigger to the client application processor 102 over connection 107*c*. If more than one match is found for a given fingerprint or cue, the closest match that has the most similarities with a received fingerprint is used.

Upon receiving the trigger, the application processor 102 at step 506 launches a context-sensitive application (e.g., application 202). At step 507, the context-sensitive application displays an option on a TV screen of the TV system that includes an option to switch to an alternative or related version of the video program from a video server (e.g., a startover button overlay). At step 508, a channel change event or an event timeout can be detected. If either event is detected, the process starts over at step 502. In the event neither event is detected, the context-sensitive application detects a selection of the option by a user at step 509. At step 510, the context-sensitive application establishes a connection to VoD server 211 or 312 using a URL of the VoD server 211 or 312. At step 511, the context-sensitive application instructs the client video display to switch from live TV (or other current source of displayed content) to the VoD service.

In some examples, the context-sensitive application also contains address information of a third party server 214 or third party content broker 413 from which to obtain substitute third party content (e.g., a commercial). Further, the context-sensitive application can also contain timing information of when in the playout of a substitute or alternative video program to substitute the third party content. For example, at 512, the context-sensitive application can read the timecode of the VoD stream from the VoD server 211 or 312. At 513, it can be determined if it is time to substitute third party content of the VoD content with alternative third party content (e.g., third party content that is targeted to the user based on cookie data or browsing history). At 514, if a time for substitution is detected, the context-sensitive application can connect to the third party server 214 through a URL of the third party server 214 to receive a third party content stream. At 515, the context-sensitive application instructs the client video display to switch from the VoD stream to the third party content stream. At 516, it is determined whether a third party content timeout has occurred. If not, the context-sensitive application continues to receive the third party content stream. If a timeout has occurred, at step 518, the context-sensitive application instructs the client video display to switch from the third party content stream back to the VoD stream. At step 519, the context-sensitive application informs the matching server 107 that the third party content display event has completed (e.g., over communication link 107*d*).

At step 520, the context-sensitive application determines whether the VoD program has ended. If the VoD program has not ended, the process returns to step 512 where the context-sensitive application reads the timecode of the VoD stream. At step 521, if the VoD program has ended, the context-sensitive application instructs the TV system (or client TV) to return to live programming (or other current source of the content displayed before selection of the option to switch to the alternative or related version of the video program).

A program monitor 500 represents an independent software process that monitors user input to the TV system 101. Upon detection by the program monitor 500 of a channel change or other input change to the TV system 101, the program monitor 500 can cause a termination of the alternative video program initiated by user response to the context sensitive application (referred to as "Start Over") supplied by the matching server 107. The program manager 500 can include a daemon that runs as a background process, rather than being under the control of an interactive user.

Figure 6:
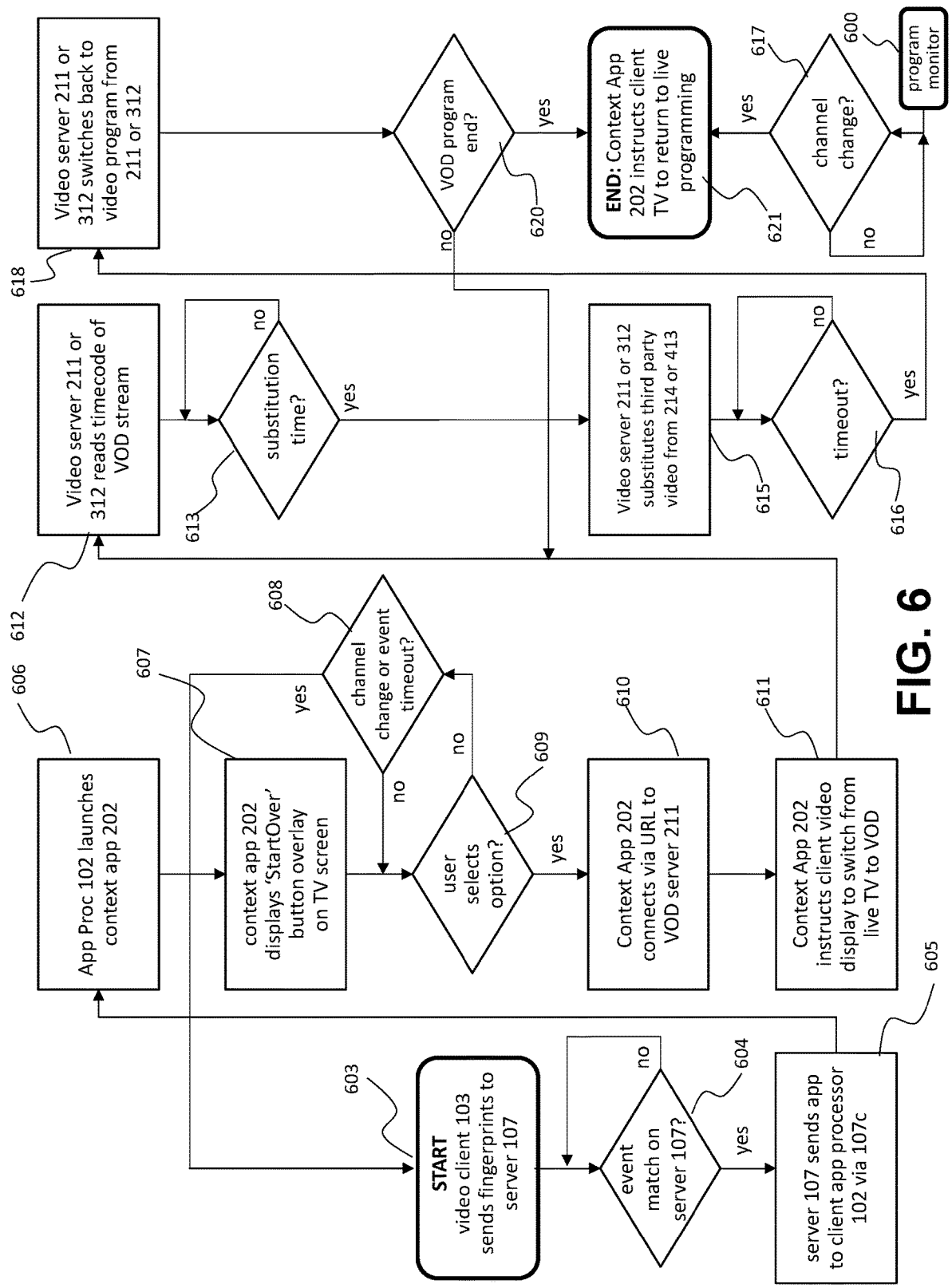
FIG. 6 is a flowchart illustrating another embodiment of a process of identifying video content being displayed and providing related content.

FIG. 6 is a flow chart summarizing steps performed by another example process in which the content matching system 107 detects first video content displaying on the TV system 101, and then transmits to the TV system 101 an application (e.g., a context-sensitive application) that executes within the processing means of the TV system 101 upon being received by the TV system 101. Execution of the application instructs the TV system to obtain video from VoD server 211 or the server 312.

At step 603, the video fingerprint client 103 can send one or more fingerprints to the matching server 107 over connection 107*a*. At step 604, the matching server 107 can detect whether there is an event match between a received fingerprint (a cue or video data of a video segment) and stored video data. In the event no match is found the matching server 107 continues to process fingerprints until a match is found. If a match is found, the matching server 107 sends the application to the client application processor 102 over connection 107*c*. If more than one match is found for a given fingerprint or cue, the closest match that has the most similarities with a received fingerprint is used.

Upon receiving the application, the application processor 102 at step 606 launches the application (e.g., context-targeted application 202). At step 607, the application displays an option on a TV screen of the TV system that includes an option to switch to an alternative or related version of the video program from a video server (e.g., a startover button overlay). At step 608, a channel change event or an event timeout can be detected. If either event is detected, the process starts over at step 602. In the event neither event is detected, the application detects a selection of the option by a user at step 609. At step 610, the application establishes a connection to VoD server 211 or 312 using a URL of the VoD server 211 or 312. At step 611, the application instructs the client video display to switch from live TV (or other current source of displayed content) to the VoD service.

In some examples, as with the process of FIG. 5, the context-sensitive application could contain address and timing instructions of where and when to obtain alternative video information. In some examples, the context-sensitive application can obtain alternative video information and the alternative video information could by means of instructions internal to its processes, substitute third party content or provide alternative information at prescribed times relative to the program material being offered. For example, at 612, the VoD server 211 or 312 can read the timecode of the VoD stream sent to TV system 101. At 613, the VoD server 211 or 312 can determine if it is time to substitute third party content of the VoD content with alternative third party content (e.g., third party content that is targeted to the user based on cookie data or browsing history). At 615, if a time for substitution is detected, the VoD server 211 or 312 can obtain substitute third party content from third party server 214 or 413, and can substitute the substitute third party content into the VoD content stream that is transmitted to the context-sensitive application. At 616, the VoD server 211 or 312 can determine whether a third party content timeout has occurred. If not, the VoD server 211 or 312 continues to provide the VoD content with the third party content. If a timeout has occurred, at step 618, the VoD server 211 or 312 switches back from the third party content stream to the VoD content.

At step 620, the context-sensitive application determines whether the VoD program has ended. If the VoD program has not ended, the process returns to step 612 where the context-sensitive application reads the timecode of the VoD stream. At step 621, if the VoD program has ended, the context-sensitive application instructs the TV system (or client TV) to return to live programming (or other current source of the content displayed before selection of the option to switch to the alternative or related version of the video program).

As with the process of FIG. 5, the process shown in FIG. 6 includes a user input program monitor 600 that acts on user-initiated video input (e.g., changes in channel, video input to TV system 100, or the like) in order to terminate the context-sensitive application upon said changes.

The example embodiments disclosed in FIG. 1-FIG. 4 and the flow charts depicted in FIG. 5 and FIG. 6, provide systems and methods that extends the meaning of the previously used term "contextually targeted" beyond the display of simple graphics or short video segments related to the associated content, to include the complete substitution of the same or substantially enhanced forms of the selected content. These systems and methods replaces a video segment currently being viewed in its entirety with a video that is in a VoD-like format, which enables the viewer to re-start the content from the beginning, and can include a complete "virtual DVR" control including restarting, pausing, fast-forwarding, and rewinding functions. The systems and methods also provide an ability to view the content at higher resolutions, in 3D video format, or other enhanced format, if available. The systems and methods also provide an ability to remove commercial messages from the replacement video segment and to substitute messages that are more closely related to anticipated interests of the viewer, for example, based on location, demographics, or previous shopping behavior. The anticipated interests of the user can be determined based on such information being stored in the form of compact data modules of the type often called "cookies" in the memory of a connected TV viewing system, such as a Smart TV. This enables the development and sale to sponsors or brokers of various premium, closely-targeted third party content products, or in an alternative business model, the removal of some or all of the third party content messaging as a premium service for the viewer.

The methods and systems described herein employ a central automated content recognition system (e.g., matching server 107) to detect a video program currently displayed on the remote client TV system 101 (e.g., based on a displayed video segment). The matching server 107 (or in some embodiments the TV system 100 itself) can determine if the video program has an available on-demand copy, and the central system can cause the remote TV system 101 to display a graphical interface (e.g., a graphical overlay overlaid over the displayed video program) offering the option for the viewer to switch to an on-demand version of the video program, either from the beginning of the program or at the point where the viewer is currently watching.

In some embodiments, when a viewer accepts the option to view the video program in an on-demand mode, the system can provide DVR-like control of the video program with control originating from the client application operating in the television system 101 (smart-TV). The DVR-like control is conveyed to a server (e.g., VoD server 211, server 312, or other central server) that is responsive to the control commands and provides transport control of the video program to allow the viewer to change aspects of the video program (e.g., to rewind, pause, fast-forward, stop, or perform some other suitable function to the video program).

In some embodiments, the systems and methods described herein provide the user with the option for a higher-quality version of the detected video program that is being displayed. The viewer has the option to view the high-quality version of the program from the beginning or at any point in the program, including the currently viewed instant, as described above. The higher-quality program may be, for example, a new ultra-high-definition format such as the 4K ultra-HD programming, or other higher quality format than that currently being viewed by the viewer. It should be obvious to the skilled person that any enhanced variation of a video program is equivalent. Such variations may include 3D-video versions, or even higher definition versions than 4K ultra-HD.

In some embodiments, the systems and methods described herein can provide other viewing options for a version of the program being viewed. For example, further viewing options can include the provision of versions of a video program with fewer or even no commercials. In some examples, when a viewer accepts the option to view a video program in an on-demand mode (e.g., to start the program over from the beginning, to view a different quality video, or the like), the system may substitute third party content (e.g., a television commercial) at specific times during the program. The third party content can be provided by a separate server means from the on-demand source of said video. In some embodiments, when a viewer accepts the option to view a video program in an on-demand mode (e.g., to start the program over from the beginning, to view a different quality video, or the like), the system can substitute third party content at specific times during the program. The third party content may be provided by a server means separate from the on-demand source of said video. The availability of a third party content substitution opportunity is conveyed by a computer application operating within the viewer's network-enabled television system and in communications with a third party content delivery server. The network-enabled television system may also retain code modules or "cookies" with data on the user's demographics and previous viewing and purchase behavior to enable sponsors to more tightly-target commercial messages. In some embodiments, the third party content substitution may take place between the VoD server (e.g, server 211 or 312) and the third party content server (e.g., third party server 214) without the involvement of the TV system 101.

In some embodiments, when a viewer accepts the option to view a video program in an on-demand mode (e.g., to start the program over from the beginning, to view a different quality video, or the like), the system can substitute third party content at specific times during the program, and the third party content may be provided by a server that is separate from the on-demand source of said video. The substitute third party content may be provided by an third party content bidding process where certain demographic or other information regarding the television viewer is provided to an auction system such that the auction bidder can bid for the time slot available when the ad slot becomes available in the course of viewing the on-demand video program. The availability of a third party content substitution opportunity is conveyed by a computer application operating within the viewer's network-enabled television system and in communications means with a video third party content delivery means.

In some embodiments, when a viewer accepts the option to view a video program in an on-demand mode (e.g., to start the program over from the beginning, to view a different quality video, or the like), the matching server 107 or the TV system 101 can present an option for the viewer to consume the on-demand content on a device other than the TV from which the user is currently engaged. Such devices may include mobile phones, tablets (e.g., the Apple iPad), or other device that is separate from the television system on which the original content was viewed.

When a viewer accepts the option to view a video program in an on-demand mode (e.g., to start the program over from the beginning, to view a different quality video, or the like), the matching server 107 or the TV system 101 can provide an option for the viewer to consume the on-demand content in a different form such as with a different screen resolution, a longer version of a program, a version of the program with additional scenes, a version of the program with an alternate plot, or other form.

In some examples, a system, including a centrally located computer means, is provided for automatically identifying a video program currently displaying on a remote television and providing contextually-targeted content to the remotely located television system while the live video segment is displayed on the video screen, where the contextually-targeted content comprises a visual graphic offering the viewer the option to select an alternative or related version of the content delivered to said remote television system from a video-on-demand server or other means.

In some embodiments, the alternative or replacement version of the content may be viewer selectable from a plurality of video program choices with features including DVR control capability, the display format and resolution of the content, and reduced commercial messaging.

In some embodiments, commercial sponsors or commercial brokers may interact with the centrally located computer system to purchase targeted local third party content opportunities that may be available in the customized content stream.

In some embodiments, a computer system as part of the remote television system is given instructions to address a central video server system when a user of said television chooses to accept the option to switch from original to alternative version of a television program.

In some embodiments, a computer system as part of the remote television system is given instructions to address a central third party content server system when a user of said television chooses to accept the option to switch from original to alternative version of a television program and further said instructions contain the run-time of said alternative television program at which the remote television system will address the third party content server to replace an item of third party content at said time interval of the alternative program with a demographically targeted item of third party content targeted to the viewer's interests.

In some embodiments, the information containing the interests of the viewer is stored in a cookie or other data means in the memory means of the processor contained in said television system.

In some embodiments, the information containing the interests of the viewer is derived by a computer program means which records the previous actions of the user with regards to changing channels during ad breaks or the by means of the user requesting additional information when presented with the opportunity or from information derived from the user's activity which utilizing a personal computer or mobile device which interacting with Internet sources.

In some embodiments, the alternative or replacement version of the content may be viewed on a second video screen such as a computer laptop or tablet or other television system.

Figure 7:
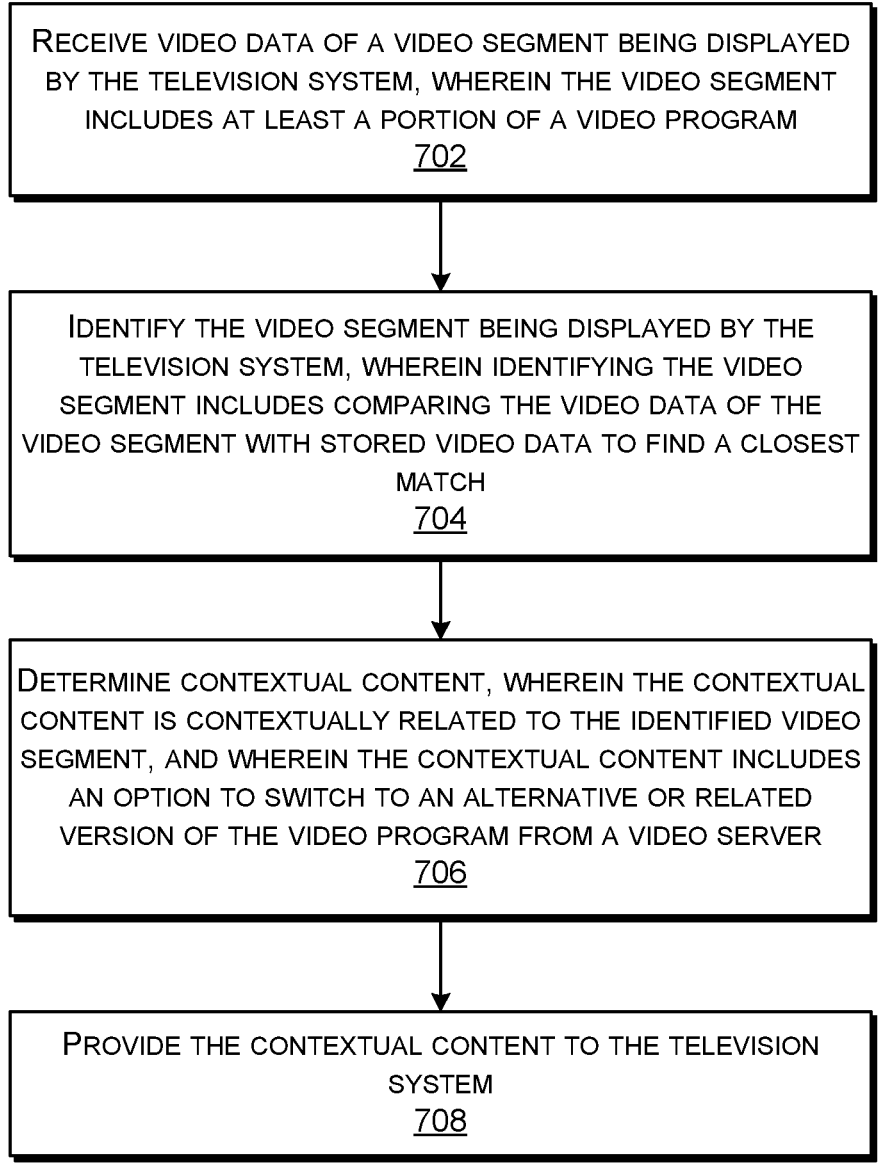
FIG. 7 is a flowchart illustrating an embodiment of a process of identifying video content being displayed.

FIG. 7 illustrates an embodiment of a process 700 for identifying video content being displayed by a television system. In some aspects, the process 700 may be performed by a computing device, such as the matching server 107.

Figure 8:
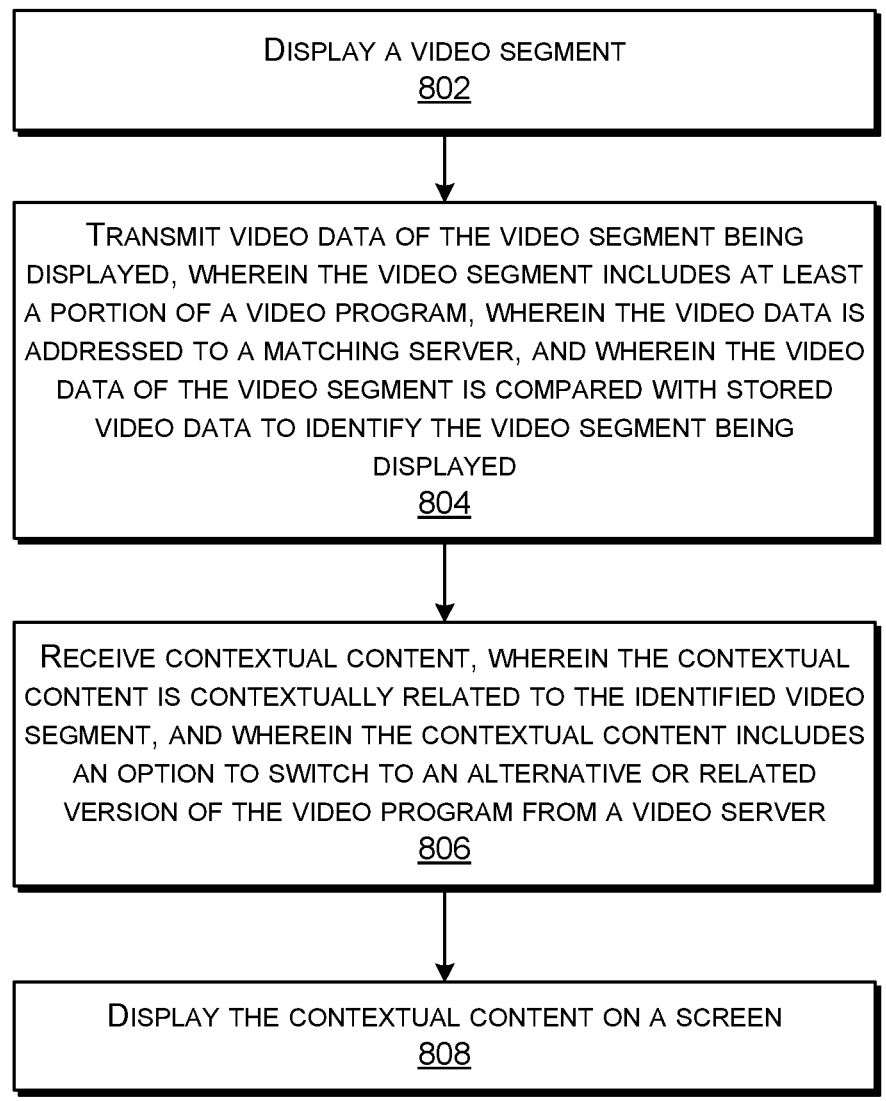
FIG. 8 is a flowchart illustrating another embodiment of a process of providing information used to identify video content being displayed.

FIG. 8 illustrates an embodiment of a process 800 for providing information for identifying video content being displayed by a television system. In some aspects, process 800 may be performed by a computing device, such as the television system 101. The computing device may include a network-connected television (a smart TV), a mobile device, a mobile telephone, a smartphone, a desktop computer, a laptop computer, a tablet computer, or any other suitable computing device.

Process 700 and process 800 are each illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and process 800 each may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

As noted above, the process 700 includes a process for identifying video content being displayed by a television system. At 702, the process 700 includes receiving video data of a video segment being displayed by the television system, wherein the video segment includes at least a portion of a video program. In some examples, the video segment can include a portion of the video program other than a beginning portion (e.g., a video segment in the middle of the program). At 704, the process 700 includes identifying the video segment being displayed by the television system. Identifying the video segment includes comparing the video data of the video segment with stored video data to find a closest match. In one example, the video segment can be identified by sampling (e.g., at fixed intervals, such as five times per second, ten times per second, fifteen times per second, twenty times a second, or any other suitable interval) a subset of the pixel data being displayed on the screen (the pixel data of a frame comprising the video segment), and then finding similar pixel data in the content database. One of ordinary skill in the art will appreciate that the other methods of identifying video content being displayed described herein can be used to identify the video content.

At 706, the process 700 includes determining contextually related content. The contextually related content is contextually related to the identified video segment, and includes an option to switch to an alternative or related version of the video program from a video server. For example, the alternative or related version of the video program can include a version of the video program starting from the beginning of the video program. In one instance, the alternative version can be provided from a VoD server that provides a version of the program to the viewer that starts from the beginning. For example, the video server can include a video-on-demand server. At 708, the process 700 includes providing the contextually related content to the television system. The television system can then present the contextually related content to a viewer.

As noted above, the process 800 includes a process for providing information for identifying video content being displayed by a television system. At 802, the process 800 includes displaying a video segment. The video segment includes at least a portion of a video program. At 804, the process 800 includes transmitting video data of the video segment being displayed. The video data is addressed to and thus sent to a matching server. The video data of the video segment is compared with stored video data to identify the video segment being displayed. For example, the matching server can compare the video data of the video segment with stored video data.

At 806, the process 800 includes receiving contextually related content. The contextually related content is contextually related to the identified video segment, and includes an option to switch to an alternative or related version of the video program from a video server. For example, the alternative or related version of the video program can include a version of the video program starting from the beginning of the video program. In one instance, the alternative version can be provided from a VoD server that provides a version of the program to the viewer that starts from the beginning. For example, the video server can include a video-on-demand server. At 808, the process 800 includes displaying the contextually related content on a screen In some embodiments of process 700 and process 800, selection of the option to switch to the alternative or related version of the video program causes the television system to receive a version of the video program starting from the beginning of the video program. In some embodiments, the contextually related content is displayed by the television system while the video program is displayed on a video screen of the television system. For example, the option can be displayed as an overlay or pop-up window over the displayed video program. In some embodiments, the contextually related content includes a graphical interface with the option to switch to the alternative or related version of the video program.

In some embodiments, the contextually related content further includes an option to select from a plurality of video program choices. In some examples, the plurality of video program choices include video control capability, display format of the video content, or reduced commercial messaging.

In some embodiments, the television system requests the alternative or related version of the video content from the video server when the option to switch to the alternative or related version of the video program is selected.

In some embodiments, the television system is connected with a third party content server when the option to switch to the alternative or related version of the video program is selected. For instance, the television system can connect with the third party server to obtain third party content from the third party content server at a specified time interval of the alternative or related version of the video program.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system for identifying video content being displayed by a media system, the system comprising:
   one or more processors; and
   a non-transitory machine-readable storage medium containing instructions which when executed on the one or more processors, cause the one or more processors to:
   identify a video segment being displayed by the media system, wherein the video segment includes at least a portion of a version of a video program;
   determine contextual content being contextually related to the identified video segment, the contextual content including an alternative version of the video program, wherein the version and the alternative version include a same video program, the alternative version including at least one of a customization or a substitution of third party content relative to third party content that is part of the version of the video program; and
   transmit one or more software instructions, wherein the one or more software instructions, when received by the media system, cause a software application associated with the contextual content to execute on the media system, the software application providing the contextual content to the media system and causing at least one of the customized or substituted third party content to be presented in place of the third party content that is part of the version of the video program.

2. The system of claim 1, further comprising instructions which when executed on the one or more processors, cause the one or more processors to:

instruct a third party server to provide at least one of the customized or substituted third party content to the media system.

3. The system of claim 2, wherein the alternative version of the video program is from a video server.

4. The system of claim 1, further comprising instructions which when executed on the one or more processors, cause the one or more processors to:
instruct a third party server to provide at least one of the customized or substituted third party content to a video server, the video server being configured to provide the alternative version of the video program and at least one of the customized or substituted third party content to the media system.

5. The system of claim 1, wherein the software application associated with the contextual content includes embedded address information, the embedded address information providing access to at least one of the customized or substituted third party content.

6. The system of claim 1, wherein the software application associated with the contextual content includes timing information, the timing information indicating a time in the alternative version of the video program to substitute at least one of the customized or substituted third party content.

7. The system of claim 1, wherein the contextual content is determined based on at least one of cookie data or browsing history.

8. The system of claim 1, wherein the contextual content includes an option to switch to the alternative version of the video program, and wherein selection of the option causes the media system to switch from the version of the video program to the alternative version of the same video program.

9. The system of claim 8, wherein the media system is connected with a third party content server when the option is selected, wherein the media system connects with the third party content server to obtain at least one of the customized or substituted third party content at a specified time interval of the alternative version.

10. The system of claim 1, further comprising instructions which when executed on the one or more processors, cause the one or more processors to:
transmit, to the media system, one or more software applications configured for execution by the media system.

11. A computer-implemented method comprising:
identifying a video segment being displayed by the media system, wherein the video segment includes at least a portion of a version of a video program;
determining contextual content being contextually related to the identified video segment, the contextual content including an alternative version of the video program, wherein the version and the alternative version include a same video program, the alternative version including at least one of a customization or a substitution of third party content relative to third party content that is part of the version of the video program; and
transmitting one or more software instructions, wherein the one or more software instructions, when received by the media system, cause a software application associated with the contextual content to execute on the media system, the software application providing the contextual content to the media system and causing at least one of the customized or substituted third party content to be presented in place of the third party content that is part of the version of the video program.

12. The method of claim 11, further comprising instructions which when executed on the one or more processors, cause the one or more processors to:
instruct a third party server to provide at least one of the customized or substituted third party content to the media system.

13. The method of claim 12, wherein the alternative version of the video program is from a video server.

14. The method of claim 11, further comprising instructions which when executed on the one or more processors, cause the one or more processors to:
instruct a third party server to provide at least one of the customized or substituted third party content to a video server, the video server being configured to provide the alternative version of the video program and at least one of the customized or substituted third party content to the media system.

15. The method of claim 11, wherein the software application associated with the contextual content includes embedded address information, the embedded address information providing access to at least one of the customized or substituted third party content.

16. The method of claim 11, wherein the software application associated with the contextual content includes timing information, the timing information indicating a time in the alternative version of the video program to substitute at least one of the customized or substituted third party content.

17. The method of claim 11, wherein the contextual content is determined based on at least one of cookie data or browsing history.

18. The method of claim 11, wherein the contextual content includes an option to switch to the alternative version of the video program, and wherein selection of the option causes the media system to switch from the version of the video program to the alternative version of the same video program.

19. The method of claim 18, wherein the media system is connected with a third party content server when the option is selected, wherein the media system connects with the third party content server to obtain at least one of the customized or substituted third party content at a specified time interval of the alternative version.

20. A non-transitory computer-readable medium having stored thereon instructions that, when executed by one or more processors, cause the one or more processor to:
identify a video segment being displayed by the media system, wherein the video segment includes at least a portion of a version of a video program;
determine contextual content being contextually related to the identified video segment, the contextual content including an alternative version of the video program, wherein the version and the alternative version include a same video program, the alternative version including at least one of a customization or a substitution of third party content relative to third party content that is part of the version of the video program; and
transmit one or more software instructions, wherein the one or more software instructions, when received by the media system, cause a software application associated with the contextual content to execute on the media system, the software application providing the contextual content to the media system and causing at least one of the customized or substituted third party content to be presented in place of the third party content that is part of the version of the video program.

* * * * *